US007708825B2

(12) United States Patent
Sun et al.

(10) Patent No.: US 7,708,825 B2
(45) Date of Patent: May 4, 2010

(54) SIALITE BINARY WET CEMENT, ITS PRODUCTION METHOD AND USAGE METHOD

(75) Inventors: Henghu Sun, Beijing (CN); Weirui Xu, Beijing (CN); Guangju Gai, Beijing (CN); Shuqin Li, Beijing (CN)

(73) Assignee: Tsinghua University, Beijing (CN)

( * ) Notice: Subject to any disclaimer, the term of this patent is extended or adjusted under 35 U.S.C. 154(b) by 913 days.

(21) Appl. No.: 10/540,599

(22) PCT Filed: Dec. 24, 2003

(86) PCT No.: PCT/CN03/01110

§ 371 (c)(1),
(2), (4) Date: Jan. 16, 2006

(87) PCT Pub. No.: WO2004/058662

PCT Pub. Date: Jul. 15, 2004

(65) Prior Publication Data
US 2006/0288912 A1 Dec. 28, 2006

(30) Foreign Application Priority Data
Dec. 24, 2002 (CN) ................................. 02 1 58190

(51) Int. Cl.
*C04B 14/00* (2006.01)
(52) U.S. Cl. .................. 106/705; 106/713; 106/714; 106/715; 106/716; 106/739; 106/745; 106/789
(58) Field of Classification Search ............... 106/739, 106/745, 705, DIG. 1, 713, 714, 715, 716, 106/789
See application file for complete search history.

(56) References Cited
U.S. PATENT DOCUMENTS
4,174,974 A * 11/1979 Fondriest
(Continued)

FOREIGN PATENT DOCUMENTS
CA 2324486 A1 * 4/2002
(Continued)

OTHER PUBLICATIONS
JP 04083744 (Fuchigami et al.) Mar. 17, 1992 abstract only.*
(Continued)

*Primary Examiner*—Paul Marcantoni
(74) *Attorney, Agent, or Firm*—Michael Best & Friedrich LLP

(57) ABSTRACT

The technical field of the invention belongs to concrete and cement. The invention relates to a sialite binary wet cement and its package, transportation, storage and application. The sialite binary wet cement is composed of a "female body" as a primary component and a "male body" as a secondary component both of which are produced, stored, and transported separately, and are mixed together when they are used, wherein the "female body" and the "male body" each have a specific surface area of 2800-7500 $cm^2/g$, the "female body" is mainly composed of inorganic cementitious materials and water, and it is in slurry, paste or wet powder form during the whole period of its production, storage, transportation and usage; the "male body" is mainly composed of inorganic cementitious materials, and it can be a wet form or a dry powder form. When they are used, the "female body" and the "male body" are mixed together with a small amount of regulating agents. There is no generation of dust, $SO_2$, NOx and $CO_2$ during production and application of the sialite binary wet cement. Therefore heavy pollution of a traditional cement industry is avoided, and energy consumption and cost of product are decreased. The starting materials of the said cement mainly come from natural mineral, various slag and cinder. The said cement can be used for building, traffic, water conservancy, mine filling, timbering, and solidation of roadbed.

19 Claims, 5 Drawing Sheets

U.S. PATENT DOCUMENTS

| | | | |
|---|---|---|---|
| 4,756,761 A * | 7/1988 | Philip et al. | |
| 4,778,523 A * | 10/1988 | Tomari et al. | |
| 5,096,497 A | 3/1992 | Beale et al. | |
| 5,447,197 A * | 9/1995 | Rae et al. | |
| 5,516,357 A * | 5/1996 | Edlinger et al. | |
| 5,547,506 A * | 8/1996 | Rae et al. | 106/730 |
| 5,728,209 A * | 3/1998 | Bury et al. | |
| 5,762,701 A | 6/1998 | Biagini et al. | |
| 5,906,497 A | 5/1999 | Pham et al. | |
| 6,299,679 B1 * | 10/2001 | Montoya | |
| 6,468,345 B1 * | 10/2002 | Zhu et al. | |
| 6,491,751 B1 * | 12/2002 | Watson | |
| 6,740,157 B2 * | 5/2004 | Piniecki | |
| 6,907,928 B2 * | 6/2005 | Di Lullo Arias et al. | |
| 6,946,014 B2 * | 9/2005 | Poupardin et al. | |
| 2005/0132933 A1 * | 6/2005 | Blum | |

FOREIGN PATENT DOCUMENTS

| | | | |
|---|---|---|---|
| CN | 1007890 B | 5/1990 | |
| CN | 1024918 C | 6/1994 | |
| CN | 1105344 | 7/1995 | |
| CN | 1245786 A | 1/2000 | |
| CN | 1257845 A | 6/2000 | |
| JP | 0483744 | * | 3/1992 |
| JP | 2000185951 | | 7/2000 |
| RU | 2137727 C1 | | 9/1999 |
| SU | 89980 | | 8/1949 |
| SU | 416326 | | 11/1974 |
| SU | 777000 | | 11/1980 |
| WO | WO 0162458 | | 8/2001 |

OTHER PUBLICATIONS

CA 2324486 A1 (Apr. 24, 2002) Novak abstract.*
BE 867392 CENT RECH Sep. 18, 1978 abstract only.*
CN 1429786 DONG Jul. 16, 2003.*
"Preparation of fused cements by the V.V. Serov Conversion Method", Krylov, Mendeleeva, Tr. Sovesch. Moscow (1962), pp. 149-154. STN on Chemical Abstracts. AN:58:72100 CA. abstract only.*
"A research development on the utilization of coal ash as raw material of cement..Part I. An experimental manufacture of high $3CaO.Al_2O_3$ cement by burning in electric furnaces", Okuda et al., Denryoku Chuo Kenkyusho Hokoku 1980, 380024, 41 pages. abstract only—AN: 95:47881 CA abstract only.*
"Producing Portland cement from iron and steel slags and limestone", Monshi et al., Cement and Concrete Research (1999), 29(9), 1373-1377. abstract only.*

* cited by examiner

SIALITE BINARY WET CEMENT, ITS PRODUCTION METHOD AND USAGE METHOD

RELATED APPLICATION DATA

This application claims priority from China Patent Application No. 02158190.8, filed Dec. 24, 2002, and PCT Application No. PCT/CN2003/001110, filed Dec. 24, 2003, both of which are incorporated by reference herein.

FIELD OF THE INVENTION

The present invention relates to a new sialite binary wet cement, and further relates to production method (including package, storage and transportation method) and usage method of the wet cement, and its application.

PRIOR ART OF THE INVENTION

For recent 100 years, many novel types of cement, and special cements are appearing ceaselessly. Although a variety of cements have different properties, from the viewpoint of the process technology, Portland cement (also called ordinary cement) is a representative of the traditional modern cements. By means of quite mature knowledge (phase diagrams and phase rules) and technical means, production of Portland cement can be strictly controlled and the product properties can be predicted, because in the final cement clinker of the "one component" cement there are various mineral components having definite compositions and properties. When being used, dry powders of ordinary cement just need to mix with some water, aggregate, (a small amount of regulating agents, water-reducing agent etc. may be added, if necessary), need not to mix with any other activators, and can hydrate themselves to form a concrete. Therefore, the ordinary cement can be called "one component" dry cement.

For recent 50 years, along with rapid increase of the demand of cement and strengthening of human consciousness for harnessing the slag pollution, dust pollution and air pollution, various active or inactive mixed materials are added into Portland cement, and various substitutes of the traditional "one component" cement arise, especially "environment friendly" and cheap cementitious materials are exploited ceaselessly, and they get gradually extensive applications in many fields, in which the Portland slag cement (including Portland fly-ash cement, Portland pozzolana cement) has entered into the main stream of cement industry (see GB1344-1999). For example, by using cinders (pozzolana, fly-ash) to substitute a part of clinker, it forms one type of "mixed material" cement (or called composite cement). In it, the traditional cement clinker still takes a quite big ratio, and the processing concept, route and equipment follow basically those of the existed cement clinkers.

However, when analyzing and understanding new phenomena and rules occurring in the products from hydrating and hardening processes of the composite cement, it is found that the composite cement cannot be clearly explained by the "one component" cement theories.

It is well known that cement is one of three basic materials in the building industry, and has extensive application and great use amounts. Most commonly used cement is Portland cement series, see GB175-1999 (PORTLAND CEMENT AND ORDINARY PORTLAND CEMENT, STANDARD NO. GB175-1999). However, the pollution and the damage of ecological environment caused by the development of cement are also strong enemies of developing civilization of human beings. Cement is generally classified as the following six kinds: Portland cement, ordinary Portland cement, slag Portland cement, fly ash Portland cement, pozzolana Portland cement and composite cement. The later four kinds are classified according to types of the added mixing materials.

All the traditional processes of producing cement include "two milling and one calcining", i.e., the following three processes: starting material formulating and pulverizing, clinker calcining and cement milling. For example, for the most commonly used Portland cement, the cement clinker is mainly produced from limestone, clay, ferrite powders and coal. The active components in cement clinker are mainly tricalcium silicate and dicalciun silicate minerals, which can form at about 1450 degrees Celsius or can form at about 1300 degrees Celsius with adding some mineralizing agents (see Shen Wei, Huang Wenxi, et. al, CEMENT TECHNOLOGY, Wuhan, Wuhan Industrial University Publishing House, 1990; Yuan Runzhang, CEMENTITIOUS MATERIALS SCIENCE Wuhan, Wuhan Industrial University Publishing House, 1996). From producing processes to using processes of cement, drying, crushing and milling starting materials, calcining clinker and milling cement cause two serious pollutions, namely solid pollution and gas pollution, which also are the "killers" to destroy ecological environment.

Because it is a nonnegligible problem that the huge energy, coal, mineral resource, land resource in the cement production of the prior arts are expensed, and that air pollution caused by harmful gas and dust generated in the milling and calcining processes, especial in calcining process of clinker, a great quantity of $SO_2$, $NO_x$ and $CO_2$ are discharged to cause serious air pollution, environment pollution, land pollution, water resource pollution and destroy of the ecosystem (See Wu Zhongwei, Tao Yousheng, PRESENT SITUATION AND PROBLEMS OF CHINA CEMENT AND CONCRETE INDUSTRIES, fly ash, 1999, (1):3, Wu Zhongwei, DEVELOPMENT DIRECTION OF CHINESE CEMENT INDUSTRY, China Building Material, 1999, (4):11).

Today, with rapid development of economy, the industrial waste slags increase continually. The industrial solid waste, such as blast furnace slag and steel slag, nonferrous metal metallurgical slag, power plant slag and chemical industry slag, take a rather big ratio in the material circulation. For example, in China, the total steel output is over 200 million ton per year, and water-quenching slag of blast furnace is about 60 million tons per year, which plus the steel slag will be over 100 million tons. As an example, coal-burning type firepower plant is a kind of main power plant in China. Because of development of the electric power industry, numbers of coal-burning electricity generator increase continually and scale of firepower plant increases continually, which results in a rapid increase of fly ash. The total quantity of slag of firepower plant in 1985 is 37.68 million tons, and that in 1995 is 99.36 million tons, averagely increasing 5.6 million tons per year. In 2000, discharge amount of fly ash is 160 million tons, and accumulation of fly ash from power plant is more than 1.2 billion tons, which occupy over 400 thousand mu of land. It is very important how to get a good comprehensive utilization of the fly ash. Besides, oil resource of China is relatively meager. It is predicated that oil importation amount will reach 160 million tons in 2010. It is the national policy to make liquid fuel by using coal to substitute for a part of oil. It needs about 5 tons of coal for synthesizing 1 ton oil, if the two-step method is employed (first gasification, then liquefaction). 100 million tons or more of solid slags will be produced if 100 million tons of oil were synthesized per year (See Jiang Xuerong, Lin Jiedong, et. al., STATUS OF COAL-ASH COMPREHENSIVE UTILIZATION AND ITS DEVELOPMENT TREND, electric power environment protection, 2002, 18(3):55; Liu Shuangshuang, Han Mingfang, PRESENT SITUATION AND DEVELOPMENT TREND OF UTILIZATION OF FLY ASH IN CHINA, China Coal, 2001, 27(8):43; Zhu Guilin, Sun Shusan, et. al, PRESENT SITUATION AND DEVELOPMENT TREND OF RESOURCE UTILIZATION OF METALLURGICAL SLAG, China resource comprehensive utilization, 2002, (3): 29; T. Takahashi, K. Yabuta. NEW APPLICATION FOR IRON AND STEELMAKING SLAG. NKK Technical Review, 2002, (87): 38).

If all the solid waste slags stated above are used, it will be the important technology revolution in energy fields, environment and material fields in 21 century.

The so-called composite materials of cement refer to synthetic and natural mineral materials which are added into cement in order to improve cement properties and to adjust cement grades. In the prior art, the industrial waste slag etc. used in the composite cements as composite material replace a part of cement clinker merely, and cement clinker still constitutes considerable proportions of the cement, and thus it is the main part for imparting cement strength. All the hydraulic cementing fiber slag Portland cements are produced by mixing and milling (sometimes referred to herein as "levigating") Portland clinker and granulate blast furnace slag, together with appropriate amount of gypsum. In the cement, blending amount of the granulate blast furnace slag is 20-70% by weight based on total weight of the cement. It is allowable to use one out of limestone, kiln ash, fly ash and pozzolana composite material to replace the slag, but the replace amount cannot exceed 8% by weight of the cement, and in the obtained cement the blast furnace slag is not less than 20%. Pozzolana Portland cement is a hydraulic cementing material produced by mixing and milling Portland clinker and pozzolana mixture together with appropriate amount of gypsum. In the cement, blending amount of the pozzolana mixture is 20-50% by weight based on total weight of the cement. Fly ash Portland cement is a hydraulic cementing material produced by mixing and milling Portland clinker and fly ash together with gypsum, in the cement, blending amount of fly ash is 20-40% by weight based on total weight of the cement. All the hydraulic cementing materials produced by mixing and milling Portland cement, two or more specified composite materials together with appropriate amount of gypsum. Total blending amounts of the composite material is greater than 15% by weight and not greater than 50% by weight based on total weight of the cement. It is allowable to use kiln ash of 8% by weight to replace a part of the composite material, but when slag is blended, blending amount of the composite materials cannot be repeated with the amount of the slag Portland cement (see PORTLAND CEMENT AND ORDINARY PORTLAND CEMENT STANDARD, Standard No. GB 175-1999; Portland blast furnace-slag cement, PORTLAND POZZOLANA CEMENT AND PORTLAND FLYASH CEMENT STANDARD, Standard No. GB 1344-1999; COMPOSITE PORTLAND CEMENT STANDARD, Standard No. GB 12958-1999).

More particularly, the composite materials are generally classified as active composite material and inactive composite material. The active composite material is ground to fine powder, and mixed together with lime or gypsum, when water is added thereinto, at a normal temperature, hydration products having cementing properties can be formed. The hydration products can be hardened both in water and in air. Inactive composite material doesn't have chemical reaction with the cement components or have merely very weak reaction with the cement components, and therefore the inactive composite substance blended into Portland clinker merely has the following functions: increasing cement output quantity or decreasing cement grade, reducing hydration heat etc. (see Hunan University et al edited, BUILDING MATERIALS, Beijing, China building industry publishing house, 1997).

According to the characteristics of the sialite binary wet cement of the present invention, it can be considered that:

(1) The process of concreting substance of ancient China (such as tabia) has the most original bud of the "binarization", the air hardening product (it is manufactured by mixing the calcium carbonate treated at high temperature treatment and clay treated not at high temperature) which is used in civil usage in early period and the later period, as well as the hydro-hardening product (it was produced by mixing the clay and calcium carbonate calcined respectively, rice water which functions as plasticizer, and water-reducing agent, and some plant fibers which function actually as a reinforced material) used in tombs of kings and emperors, tombs of patricians, the Great Wall, bastion and castles.

(2) The cementitious materials (according to Davidovite, it is called clay aggregating cement) used in pyramids of ancient Egypt were obtained by the process that the calcined clay and other starting materials conducted "secondary (net-work) feldsparization" at room temperature, and these also have a bud of the characteristics of the "binarization" process.

(3) The cementitious material (pozzolana containing calcium,) of the ancient Roman is a transition representative from the most original "binarization" process to "one component" process.

It can be seen that the development history of cementitious materials undergoes a negation track following by other negation track which is progressing in a screw form.

Why has not the original binary system developed? The possible reasons are as follows:

(1) The theory of "one component" process has studied quite perfectly;
(2) The "one component" cement products have occupied the regnant position absolutely.
(3) Mind of people has got into the formulary of "one component" cement, and limited by "one component" process consciously or non-consciously and cannot jump out of it.

Therefore, we look forward imminently to opening up a new approach of the cement industry. Firstly, it is necessary to breach the theoretical bondage of the current "one-element" cement, and to achieve breakthroughs in production process, starting material selection, product storage, and transportation and usage method. Furthermore, it is expected to use the great number of industrial waste slags, fly ash, and the disposal resources from industry, building, traffic, water conservancy, thereby solving the problems of the industrial waste slag occupying land and causing pollution.

SUMMARY OF THE INVENTION

First object of the present invention is to provide a new cementitious material called sialite binary wet cement. It is composed of the "female body" as a primary component and the "male body" as a secondary component. The "female body" of the sialite binary wet cement is always in a wet form mixed with water during the whole period of its production, storage, transportation and usage; the secondary component of the wet cement can exist in wet form or dry powder form. The "female body" and the "male body" are produced, stored and transported separately. When the "female body" and the "male body" are used, they just are mixed together.

Second object of the present invention is to provide a new process for producing the sialite binary wet cement, which mainly uses a wet-milling process, and almost no dust occurs during whole producing processes.

Third object of the present invention is to provide starting materials for producing the "female body" of the sialite binary wet cement, which mainly use the mass materials having amorphous and/or microcrystal structure, such as various water-quenching mineral slags, as primary component, together with some regulating agents having conditioning effects and pozzolana active mixture materials.

Fourth object of the present invention is to provide a series of active mixture materials, which includes active mixture materials from both of solid industrial slags and natural active materials.

Fifth object of the present invention is to provide a method for producing starting material of the "female body" of the sialite binary wet cement.

Sixth object of the present invention is to provide a method for using the sialite binary wet cement.

Seventh object of the present invention is to solve the existing problem that industrial slags occupy land and produce big pollution sources, due to the fact that a great deal of industrial slags was used during producing process of the sialite binary wet cement. In comparison with the industrial waste slags etc. used in the composite cements of the prior art, the sialite binary wet cement of the present invention has an important difference, namely when the used industrial waste slags have completely same chemical compositions, the composite cement according to the prior art replace a part of cement clinker merely, and the cement clinker still constitutes considerable proportions of the cement, and thus the cement clinker is the main part for imparting cement strength, in contrast, in the sialite binary wet cement of the present invention the industrial waste slags are the main part for imparting cement strength.

The sialite binary wet cement is entirely different from the traditional cement—the ordinary "one component" dry cement. It is a new type of cementitious materials, called binary cement, which primary component is a slurry, paste or wet powder composed of inorganic cementitious materials together with a small amount of regulating agents and water. The inorganic cementitious materials have a fineness degree which results in a specific surface area of 2800-7500 $cm^2/g$ (see the Standard: TEST METHOD FOR FINENESS OF CEMENT (GB1345-91)). The sialite binary wet cement is mainly composed of the "female body" (primary component) and the "male body" (secondary component). The primary component exists always in a wet form-during whole manufacturing, storing, transporting and using processes and thus avoids causing dust. Its secondary component can exist in a wet form or a dry powder form. The "female body" and the "male body" must be produced, stored and transported separately, and cannot be mixed together before they are used. The "female body" slurry and "male body" slurry do not solidify when stored separately. When mixing the "male body" together with the "female body", the "male body" excites the activity of the "female body and in the meantime will take part in reactions and accordingly cause interactions, and chemical reactions (including liquid phase reaction, solid phase reaction) so as to form concreting product (including crystal type, concreting type, net-work type or their mixture), and finally form a sialite having very high strength.

The naming basis for the sialite binary wet cement of the present invention:

(1) For the traditional cements in the prior art, the process technology is same (i.e. "one component" method). As for naming of the cements, they are named by their main starting materials, such as Portland cement, aluminous cement, sulphoaluminate cement and so on. The traditional cements are characterized in that they are always in a dry form in the whole processes from manufacture, storage, transportation up to before usage, and their hydrating product is a type of hydrating silicate having high-calcium content.

(2) In modern cement industry, composite cements take quite big ratio, and also use the naming principle according to their main components, such as silicate mineral slag (pozzolana, fly ash) cement etc.

(3) The sialite binary wet cement of the present invention is comprised of two components—"female body" and "male body" both of which are obtained by a series of starting materials. The binary wet cements are characterized by that they are always in a wet form in the whole processes from manufacture, storage, transportation up to before usage, and thus the cements are clean, and have no pollution, and their product is "stone", which is different from the artifact—hydrating silicate, which is obtained by the traditional "one component" dry cement.

According to the first aspect of the present invention, there is provided a sialite binary wet cement, characterized by that it is composed of a "female body" (as a primary component) and a "male body" (as a secondary component) both of which are produced, stored, and transported separately, and are mixed together when they are used, wherein the "female body" and the "male body" each have a specific surface area of 2800-7500 $cm^2/g$, the "female body" is mainly composed of inorganic cementitious materials and water, and it is slurry, paste or wet powder form during the whole period of its production, storage, transportation and usage; the "male body" is mainly composed of inorganic cementitious materials, and it can be a wet form or a dry powder form during the whole period of its production, storage, transportation and usage;

proportion of the two components of the wet cement is that the "female body" ranges from 20% by weight to 99% by weight, and the "male body" ranges from 1% by weight to 80% by weight; preferably, the "female body" ranges from 60% by weight to 99% by weight, and the "male body" ranges from 1% by weight to 40% by weight; more preferably, the "female body" ranges from 70% by weight to 95% by weight, and the "male body" ranges from 5% by weight to 30% by weight;

in the "female body", as proportion of its main constituents, CaO ranges from 1% by weight to 60% by weight, $Al_2O_3$ ranges from 1% by weight to 60% by weight, $SiO_2$ ranges from 2% by weight to 70% by weight, MgO ranges from 0% by weight to 40% by weight, and $Fe_2O_3$ ranges from 0% by weight to 25% by weight; preferably, CaO ranges from 20% by weight to 55% by weight, $Al_2O_3$ ranges from 2% by weight to 25% by weight, $SiO_2$ ranges from 20% by weight to 50% by weight, MgO ranges from 4% by weight to 13% by weight, and $Fe_2O_3$ ranges from 0% by weight to 12% by weight; and in the "male body", pH=7-14, and as proportion of its main constituents, CaO ranges from 0% by weight to 80% by weight, $SO_3$ ranges from 0% by weight to 55% by weight, and $R_2O$ ranges from 0% by weight to 80% by weight; preferably, CaO ranges from 0% by weight to 40% by weight, $SO_3$ ranges from 0% by weight to 40% by weight, and $R_2O$ ranges from 0% by weight to 20% by weight, and at least one of CaO, $SO_3$ and $R_2O$ is greater than 0% by weight, and wherein R is an alkali metal such as K, Na.

The "female body" of the sialite binary wet cement further comprises a regulating agent which is added during production period or/and after production of the "female body".

The "female body" is a wet material produced by wet-milling one or more selected from amorphous or/and micro-crystal iron-making slag, steel-slag, blast furnace slag, fly ash, waste glass, phosphorus slag, titanium slag, fluorite slag, burned coal fines slags, and their mixtures, as well as water and a regulating agent.

On one hand, the "female body" of the sialite binary wet cement is a wet material which may be obtained by mixing the amorphous or/and micro-crystal coal-burning boiler slag together with water and a regulating agent, and then wet-milling them. Such method uses various amorphous or/and micro-crystal metallurgical slags and coal-burning boiler slags, for example, boiler slags from various industrial boilers which take coal (including the fine coal, slurry coal, lump coal) as its fuel and may include the boilers from thermal power plants, blast furnace and fluidized-bed, coal chemical industry (including coal gasification, coal liquefaction), the method comprises the following steps:

adding a given amount of calcium-rich substance (including quick lime, slaked lime and lime stone) and a small amount of mineralizing agents (such as iron powders, calcium fluoride) into the fuel fine coal, slurry coal or lump coal, melting the burned fine coal slags at high temperature during deslagging process and during the treatment process following after the deslagging step so as to melt partially or entirely the slag, and then carrying out a rapidly cooling step (such as wind cooling or water-quenching cooling), and thereby obtaining the amorphous or/and micro-crystal materials as the starting materials of the sialite binary wet cement. In this regard, the expectant amorphous and microcrystal product may be obtained with not increasing or a little increasing coal consumption amounts of boiler or with use of the remaining heat, and at the same time an additional benefit for consolidating sulfur in the burning coal and for removing $SO_2$ in the boiler flue gas.

More particularly, the coal-burning boiler slag is from various industrial boilers which take coal (including the fine coal, slurry coal, lump coal) as its fuel and may include the boilers from thermal power plants, blast furnace and fluidized-bed, coal chemical industry (including coal gasification, coal liquefaction). A given amount of calcium-rich substance (including quick lime, slaked lime and lime stone) and a small amount of mineralizing agents (such as iron powders, calcium fluoride) were added into the fine coal, slurry coal or lump coal (called "adding calcium in the fuel" method); during deslagging process (when the slag is inside hearth or is departing from hearth) or during the treatment process following after the deslagging step, a high-temperature melting step is carried out so that the slags were melted partially or entirely. Then a rapidly cooling step (such as wind cooling or water-quenching cooling) was carried out, and thereby to obtain the amorphous or/and micro-crystal materials.

Or alternatively, a given amount of calcium-rich substance (including quick lime, slaked lime and lime stone) and a small amount of mineralizing agents (such as iron powders, calcium fluoride) into the coal ash slag (called "adding calcium in the slag" method). During deslagging process (when the slag is inside hearth or is departing from hearth) or during the treatment process following after the deslagging step, a high-temperature melting step is carried out so that the slags were melted partially or entirely. Then a rapidly cooling step (such as wind cooling or water-quenching cooling) was carried out, and thereby to obtain the amorphous or/and micro-crystal materials.

On other hand, the "female body" of the sialite binary wet cement may be a wet material produced by taking the amorphous or/and microcrystal vitreous body located in the zone between Portland cement and glass in the $CaO-Al_2O_3-SiO_2$ ternary phase diagram (see FIG. 4) as starting material, and obtaining a microcrystal and/or vitreous substance having potential water-hardening activity through the steps of starting materials selecting, formulating, mix-milling, calcining and melting, then mixing the obtained substance together with water and regulating agents, and carrying out a wet-milling step.

The "female body" of the sialite binary wet cement may be a wet material produced by mixing the natural minerals (one of shale, clay, coal gangue or their mixture) calcined and dewatered at 500-1000 degrees Celsius, together with water and regulating agents, then carrying out a wet-milling step.

The "female body" of the sialite binary wet cement may be a wet material produced by mixing the calcined products taking clay (one or more selected from waste bricks, waste tiles and waste ceramics, and their mixtures) as a main component, together with water and regulating agents, then carrying out a wet-milling step.

Furthermore, the inorganic cementitious material of the "female body" may be one or more selected from pozzolana, pearlite, obsidian, pumice, sand stone, quartz sand, mine tailing, zeolite, silica fume and their mixtures.

The "male body" of the sialite binary wet cement is produced by mixing one or more selected from natural anhydrite, dihydrate gypsum, hemihydrate gypsum, chemical industry gypsum (such as phosphogypsum, fluorogypsum, salt gypsum), lime, calcium hydroxide, chemical industry lime, strong alkali, strong alkali salt, cement clinker and their mixtures, together with water and a regulating agent, and then carrying out a wet-milling step.

Or alternatively, the "male body" of the sialite binary wet cement is produced by mixing one or more selected from natural anhydrite, dihydrate gypsum, hemihydrate gypsum, chemical industry gypsum (such as phosphogypsum, fluorogypsum, salt gypsum), lime, calcium hydroxide, chemical industry lime, strong alkali, strong alkali salt, cement clinker and their mixtures, together with a regulating agent, and then carrying out a dry-milling step.

In the sialite binary wet cement, the regulating agent for regulating setting time of the "male body" and "female body" (see, TEST METHODS FOR WATER REQUIREMENT FOR NORMAL CONSISTENCY, SETTING TIME AND SOUNDNESS OF THE PORTLAND CEMENTS (GB1346-89)) is made of one or more selected from sugars, honeys, citric acid and citrate, tartaric acid and tartrate, strong alkali, dissolvable carbonate, muriate, dissolvable silicate, dissolvable sulfate, water glass, chlorinate, lignosulphonate, boric acid, borate and their mixtures.

In the "female body" of the sialite binary wet cement, water content is 0.1%-95% by weight, preferably 10%-80% by weight, more preferably 25%-70% by weight.

In the "male body" of the sialite binary wet cement, when a wet-milling used, water content is 0%-95% by weight, preferably 15%-85% by weight, more preferably 25%-70% by weight.

A method for producing the sialite binary wet cement is as follows: under the premise of satisfying a required specific surface area, using different combinations of machines suitable to wet-crushing and wet-milling, and using a method called "mixing first, then milling" in which starting materials of the "female body" and starting materials of the "male body" are mixed first in their own proportions respectively, and then they are wet-crushed and wet-milled. Or alternatively, using a method called "milling first, then mixing" in which starting materials of the "female body" and "male body" are wet-crushed and wet-milled first respectively according to grindability, then mixing and homogenizing the levigated starting material in their own proportions so as to obtain a wet material respectively. The obtained wet materials for the "female body" and "male body" should be stored and transported separately.

The "male body" of the sialite binary wet cement may comprise further a regulating agent which is added during production period or/and after production of the "male body".

If a regulating agent is added when the "female body" of the sialite binary wet cement is produced, and it is preferable that fineness degree of the regulating agent is chosen so that specific surface area is (4000-5000) cm²/g.

During production, storage, transportation and use of the sialite binary wet cement, the regulating agent may be added in amount of from greater than 0% to 10%, preferably from greater than 0% to 5% by weight based on the total weight of the "female body" and "male body" of the sialite binary wet cement.

During production package, transportation, storage and/or usage period, the "female body" and "male body" of the sialite binary wet cement, a watering or dewatering apparatus may be used.

A method for using the sialite binary wet cement may comprise merely mixing the "female body" and "male body" in proportion, and if necessary, water may be added to cause a hydrating reaction and a chemical reaction between liquid phase and solid phase, thereby forming cementitous materials which is one of crystal type, gel type, network type or their mixtures. Because the sialite binary wet cement has a hydration mechanism different from that of "one component" cement such as Portland cement, and it has good consolidation ability to a granule-rich grade aggregate (for example clay, sludge, mine overflow tailing), it is used to replace the traditional Portland cement ("one-component" dry cement), and used in various engineering constructions, such as building, traffic, water conservancy, mine backfill and timbering, subgrade strengthening or underground engineering, and used for consolidating clay, sludge, sand soil, fly ash, metal ore dressing tailings and used for cementing and filling the mine, wall material or other fields, thereby the binary wet cement has more wide usage and application fields in comparison with the traditional cement.

As one method for producing the sialite binary wet cement according to claim 1, under the premise of satisfying a required specific surface area, using different combinations of machines suitable to wet-crushing and wet-milling, and using a method called "mixing first, then milling" in which starting materials of the "female body" and starting materials of the "male body" are mixed first in their own proportions respectively and then they are wet-crushed and wet-milled so as to obtain a wet material respectively; and storing and transporting separately the obtained wet materials for the "female body" and "male body".

As other method for producing the sialite binary wet cement according to claim 1, under the premise of satisfying a required specific surface area, using different combinations of machines suitable to wet-crushing and wet-milling, and using a method called "milling first, then mixing" in which starting materials of the "female body" and "male body" are wet-crushed and wet-milled first respectively according to grindability, then mixing and homogenizing the levigated starting material in their own proportions so as to obtain a wet material respectively; and storing and transporting separately the obtained wet materials for the "female body" and "male body".

When the sialite binary wet cement is used in manufacturing concrete, the "female body" and "male body" of the wet cement are mixed and agitated together with water and an aggregate to manufacture concrete. The aggregate may be selected from one or more of mountain sand, river sand, sea sand, gobi sand, crushed stone, bulk stone, waste stone, gangue, clay, mineral classified sand, whole mineral tailings, industrial waste slag and their mixtures.

From the comparison of the sialite binary wet cement and the ordinary Portland cement, it can be seen that the wet cement of the present invention is innovative no matter from the view of the sources of starting materials, processing, management, hydrating and hardening mechanism, usage and properties of products, and has more extensive application than the traditional cement.

The first prominent advantage of the sialite binary wet cement in the present invention is that: it breaks restrictions and limits of the process of traditional cements, and provide a new wet process for producing cement, and establishes the basis to entirely solve the environment pollution of cement industry. The process flowchart can be seen in FIG. 1, FIG. 2, FIG. 3, FIG. 5, and FIG. 6 (the details are shown in the figures). The dust pollutions are greatly reduced or even wholly eliminated in the producing process of the sialite binary wet cement. The wet-crushing and wet-milling process can radically avoid the dust pollution, which cannot avoid in the traditional dry process. So $SO_2$, $NO_x$ and $CO_2$ are reduced greatly or even eliminated entirely.

The second prominent advantage of the present invention is that 95% to 100% of starting materials for producing the sialite binary wet cement need not be calcined, and this is equal to save the expenses for constructing, running, managing, material and energy consumption for the clinker production part of the same scale cement factory. Furthermore, all the starting materials need not dry-treated. Their storage, piling up and transportation doesn't need special maintenance. The starting materials entering the factory are wet-crushed and wet-milled directly, which is not only saving energy, but also saving time, saving work, simplifying production process greatly, and accordingly the production and management costs are reduced greatly.

The third prominent advantage of the present invention is that noise is much less comparing to that of the traditional dry-milling equipments; and the milling efficiency increases. For example, in Example 1, in the case for obtaining the same fineness degree (specific surface area), the output can increase greatly; in Example 2, in the case for obtaining the same output, the fineness degree (specific surface area) can increase greatly.

The fourth prominent advantage of the present invention is that the sialite binary wet cement can reduce greatly consumption and occupation of land resources in its producing process, and the starting materials of the sialite binary cement are basically entirely the industrial waste, thereby changing waste into treasures and improving the ecotypic environment.

Figure 1:
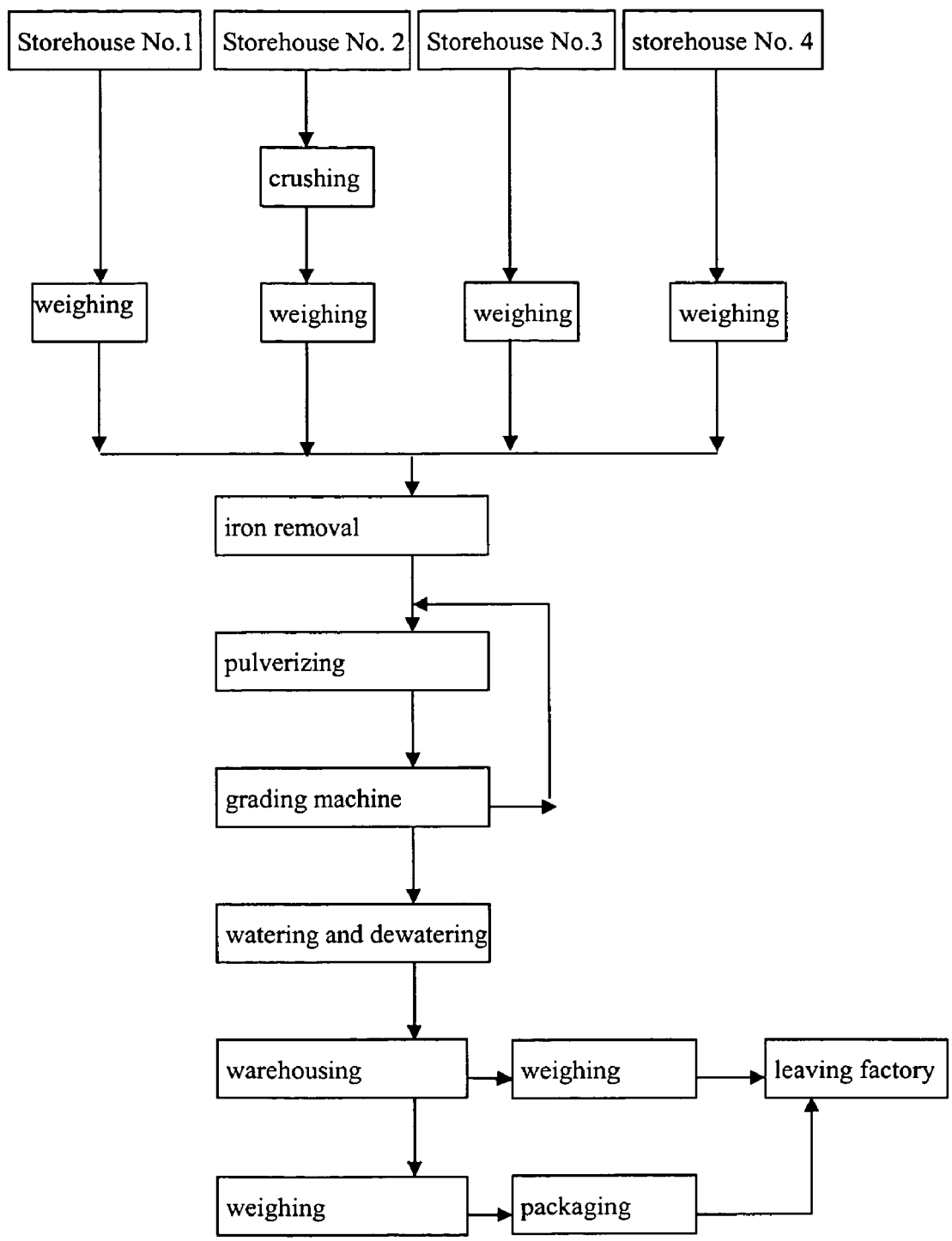
FIG. 1 is a flowchart graph for producing the "female body" of the sialite binary wet cement.

DETAILED DESCRIPTION OF THE PREFERRED EMBODIMENTS (A) Inventive Concept of the Sialite Binary Wet Cement According to the Present Invention (1) The sialite binary wet cement is composed of two components—"female body" and "male body", and the primary component is in a wet form, and is different from the "one component" cement which is mainly composed of the cement clinker and must be in dry powder form. In the sialite binary wet cement of the present invention, industrial waste slag is the main components for providing strengths.

In the traditional composite cements, relevant composite materials are added to the composite cements for playing merely a role of second hydration, and are not major elements of hydration. This is an essential difference between the traditional composite cements and the binary wet cement. The binary wet cement uses solid waste slag as main body of the cemetitious materials. Use amount of the solid waste slag can be continuously adjusted within a great scope according to working operation requirements, environments, processes and so on. Since quantitative change of the addition amount of the solid waste slag will cause a qualitative change, which is manifested by that the hydration product is different from that of the traditional cements, its physical properties change, especially the mechanical properties change, for example, it has high strength, high compactness and high durability. At present, in most cases, usage of solid waste slag has low value-added contents, and doesn't exert fully activity of the solid waste slag. There are a few of usage method which can bring out innoxiousness and impart high value-added contents. The binary wet cement uses mechanical-chemical method, chemical activating method and lithifying method etc. to exert activity of the solid waste slag.

Because properties of the binary wet cement are greater than or near to properties of Portland cement, in the present invention the binary wet cement is compared with Portland cement.

(2) The two components—"female body" and "male body" in the sialite binary wet cement have different history (heat history and stress history) respectively. They can be stored and transported respectively for long time and do not agglomerate.

(3) The sialite binary wet cement is obtained by that the "female body" and "male body" hydrate, interact each other and react chemically (including liquid phase reaction and solid phase reaction) at a room temperature.

(4) In view of weight ratio of amounts, and substance source of the reaction products, the "female body" is the substance that has better potential reaction activity and is the primary component of the cementitious material.

(5) The "male body" is the secondary component that can make the "female body" to produce activity, though its content can be less than that of "female body". Its effects include:

(i) Exciting activity of the "female body" and providing necessary reacting conditions (such as pH);

(ii) Co-reacting with the "female body" and constituting the concreting product as a part of reactant (crystalline type, gel type, net type or their mixture).

Through experiment, study, analysis to the binarization processes of the present invention, the present invention has determined to use industrial waste slag (including the various amorphous and microcrystal solid waste slags), which does not cause air pollution in the producing process and has a certain activity, as starting materials, and solved the following three problems:

1. Determining components and compositions of the binary wet cement;
2. Making the binary wet cement not to solidify for a long period (several hours to several years);
3. Making the binary wet cement to be able to solidify normally and to have very high strength when it is used.

(B) "Female Body" and "Male Body"

The "female body" and "male body" can be divided into two types:

(1) The "female body" has reaction activity itself, and the chemical reaction can spontaneously conduct under a certain condition to form cementitious substance; and function of the "male body" is to supply the reaction condition, and to excite reaction activity of the "female body" and make the reaction activity exert adequately and result in good strength.

(2) The "female body" has a certain reaction activity itself, and can react with the "male body" under a certain condition to form concreting substance. The function of the "male body" is not only supplying the necessary reacting substance with "female body", but also supplying the reacting condition to make the effect of "female body" exerted adequately and to result in good strength.

The "female body" and "male body" of the sialite binary wet cement of the present invention have very slow hydration before they are mixed together, and thus they can be stored for a long period without debase of quality. In contrast, the traditional Portland cement is apt to agglomerate, and thus to reduce or loss its cementing capacity, and as a result, its strength is reduced significantly. Even if under a good storage condition, the traditional cement cannot store for a long time, since the cement will absorb moisture and carbon dioxide from air, and accordingly retard hydration and cause carbonization, thereby its cementing capacity is lost and strength was reduced largely. Under a general storage condition, after stored for three months, the cement strength reduces by about 10%-20%; after stored for six months, the cement strength reduces by about 15%-30%; and after stored for one year, the cement strength reduces by about 25%-40%.

The "female body" is a main part of the wet cement components. When a manufacture process and a storage step are carried out in water phase, it is propitious to accelerate a early hydration of the "female body" of the wet cement, and thus a supersaturated reactant concentration is formed, thereby the materials are hydrated and homogenized sufficiently, and accordingly reaction products are formed quickly, and it is possible to improve products quality and to keep consistency of the product quality.

In order to ensure quality of the wet cement, a regulating agent can be added for adjusting spontaneous reaction degree of the "female body". In order to ensure further quality of the wet cement, a regulating agent can also be added for adjusting spontaneous reaction degree of the "male body".

One of the important aims of the "female body" of the sialite binary cement is to solve the problem of effective usage and pollution of industrial waste slag, to produce slurry by using one of the industrial waste slag, such as amorphous or/and microcrystal mineral slag including metallurgical slag, such as water-quenching slag, blaster furnace slag, phosphorus mineral slag, titanium slag, fluorite mineral slag, steel making slag, blast furnace slag, various slag of boilers burning coal, fly ash, waste glass, or the their mixtures, adding water and regulating agents, and wet-milling; or to produce slurry by using one of natural mineral calcined and dewatered at 500-1000 degrees Celsius such as shale, clay, coal gangue, or the their mixtures, adding water and regulating agents, and wet-milling. Another aim is to solve the problem of pollution and effective usage of building garbage so as to produce a slurry by using one of the factory waste products mainly composed of clay and calcined at certain temperature such as waste bricks, waste tiles, waste ceramics or their mixtures, adding water and regulating agents and wet-milling. Another aim is to solve the problem of pollution and effective usage of fly ash so as to produce wet material by using amorphous and/or microcrystal slag of boilers burning coal, i.e., using the coal slag coming from the industrial boilers and thermal power plants using fine coal or slurry coal or bulk coal as their fuel, adding some calcium-rich substance (including quick lime, slaked lime and limestone) and a small amount of mineralizing agents such as iron powders, calcium fluoride into fine coal or slurry coal or bulk, then rapidly cooling (such as wind cooling or water-quenching cooling) the burned slag when the slag departing hearth or after being melted to obtain amorphous or/and microcrystal materials, then mixing the materials together with water and regulating agents, and carrying out a wet-milling process; or to produce a slurry by using amorphous and/or microcrystal slag of coal-burning boiler, i.e., using the coal slag coming from the process of coal gasification and converting coal into oil, adding some calcium-rich substance (including quick lime, slaked lime and limestone) and a small amount of mineralizing agents such as iron powders, calcium fluoride into fine coal or slurry coal or bulk coal, when the slag departing the hearth or after being melted, rapidly cooling (such wind cooling or water-quenching cooling) the burned slag to obtain amorphous or/and microcrystal materials, then mixing the materials together with water and regulating agents and wet-milling process. The regulating agents can be added in producing process as required, or/and added after producing process as required.

The "male body" of the sialite binary wet cement can be obtained by using one or more selected from the natural anhydrite or/and dihydrate gypsum, hemihydrate gypsum, chemical industry gypsum (such as phosphogypsum, fluorogypsum, salt gypsum), lime, calcium hydroxide, chemical industry lime, strong alkali and strong alkali salt, cement clinker, various cement or their mixtures, together with regulating agents, and carrying out dry-milling or wet-milling. Furthermore, the regulating agents can be added in the manufacturing process as required, or added after the manufacturing process as required. The regulating agents of the sialite binary wet cement in the present invention can use one or more of sugars, honeys, citric acid and citrate, tartaric acid and tartrate, strong alkali, dissolvable carbonate, muriate, dissolvable silicate, dissolvable sulfate, chlorinate, water glass, lignosulphonate, boric acid, borate or their mixtures.

The starting material of the "female body" of the sialite binary wet cement can be partially substituted by using one or more of pozzolana materials, perlite, pitchstone, obsidian, pumice, shale, coal gangue, limestone, sand stone, quartz sand, clay, natural zeolite, various mineral mine tailing, silica fume or their mixture.

Today, with rapid development of economy, industrial waste slags increase continually. The industrial solid wastes, such as iron and steel plant metallurgical slag, nonferrous metal metallurgical slag, power plant slag and chemical industry slag, take a rather big ratio in the materials circulation. The inventors have studied intensively and extensively the physical and chemical properties of the above solid wastes. For example, the chemical components of fly ash and coal slag in China are silicon dioxide, aluminium oxide, iron sesquioxide, calcium oxide and unburnt-out carbon. At various areas in China and abroad, compositions of the fly ash and coal slag, which are produced by the boilers burning coal, thermal power plants, blast furnace, fluidized-bed, coal chemical industry (including coal gasification, coal liquefaction) are basically similar, and the content scopes are generally as follows:

| CaO | $Al_2O_3$ | $SiO_2$ | $Fe_2O_3$ |
|---|---|---|---|
| 1-11% | 15-40% | 30-65% | 1-20% |

The inventors found that these solid slags have similar main compositions (calculating according to oxides) in relative to the cement clinker or the metallurgical slag having good water-hardening ability, as shown in Table 1

TABLE 1

| Substance name | Chemical composition (%) | | | | |
|---|---|---|---|---|---|
| | CaO | $Al_2O_3$ | $SiO_2$ | $Fe_2O_3$ | MgO |
| fly ash | 1-11 | 15-40 | 30-65 | 1-20 | 0.5-2 |
| metallurgical slag | 38-46 | 7-20 | 26-42 | 0.2-2 | 4-13 |
| Portland clinker | 62-67 | 4-7 | 20-24 | 2.5-6 | 5 |

From Table 1, it can be seen that though the three materials contain same types of main oxides, contents are quite different. The main difference is content of the calcium oxide in fly ash slag is lower than that in metallurgical slag, and is much lower than that in clinker of Portland cement. This low calcium content is the main reason that the fly ash and coal slag cannot be used as main components of the traditional "one component" cement, and merely can be used as minor components.

The inventors further found that, various water-quenching metallurgical slag have relatively high contents of CaO, $SiO_2$ and $Al_2O_3$ (see chemical compositions of metallurgical slag shown in Table 1), and this kind of the lag is essentially amorphous and microcrystal vitreous materials. These slags each are melted slag body formed under high-temperature metallurgical condition through water-quenching cooling treatment. For example, when temperature of molted iron-making slag is in range of 1400 to 1700 degrees Celsius, the formed water-quenching ironmaking slag is essentially vitreous materials. This kind of water-quenching metallurgical slags has very high potential hydraulic set activity.

The inventors found further that the silicon dioxide, aluminum oxide in coal exist in form of mineral Kaoline ($Al_4$ [$Si_4O_{10}$] $(OH)_8$). In light of the above characteristics, the inventors found that if according to ash content of coal and required content of calcium oxide in the mineral slag or Portland cement clinker, by adding a certain amount of calcium-rich substance (including quick lime, slaked lime, limestone) into the fuel (including fine coal, slurry coal, lump coal or coal gangue) during coal converting process (including burning, gasification and liquefaction), after the mixture of coal is burnt out, it can make the chemical composition, mainly calcium oxide content, of the coal ash slag to become the intended chemical compositions of mineral slag or Portland cement clinker; the inventors also found that calcining temperature of cement clinker is about 1450 degrees Celsius, and if adding a small amount of mineralizing agents (such as iron powder, calcium fluoride), the clinker can be obtained at about 1300 degrees Celsius; however, temperature of high-temperature zone of hearth of coal-burning boiler is generally in a range of 1300-1700 degrees Celsius, which can completely satisfy the temperature required by calcining to form mineral slag or Portland cement clinker. When coal mixture burns at high temperature in hearth, the added calcium-rich substance (including quick lime, slaked lime, limestone) reacts with mineral Kaoline ($Al_4[Si_4O_{10}](OH)_8$) in the coal so that they are partially or wholly melted, then are rapidly cooled, and accordingly it is possible to form a great amount of microcrystal or amorphous substances with hydro-hardening activity.

The inventors still further found that if the calcium-rich substance (including quick lime, slaked lime and limestone) and a small amount of mineralizing agents (such as iron powder, calcium fluoride) are added into the ash slags from various industrial coal-burning boilers during deslagging process or during the treatment process following after the deslagging step so as to melt partially or entirely the slag (if the temperature cannot meet the demand, the slag can be further heated), and then the slags are rapidly cooled, it is also possible to form a great amount of microcrystal or amorphous substances with hydro-hardening activity.

Based on above knowledge, the inventors have conducted a lot of experiments, for example, three representative types are:

1. According to fly-ash content of coal and the intended content of calcium oxide in mineral slag, a sample was obtained by adding lime into coal to make the chemical composition, mainly calcium oxide content, of the slag to reach the intended chemical composition of the slag after coal mixture was burnt out (namely "adding calcium in the fuel" method), then partially or entirely melting the slags of the coal, then rapidly cooling (water-quenching) the slags. Through adjusting the added amounts of lime to change the content of calcium oxide, a series of the samples were obtained and tested. The representative chemical compositions are listed in Table 2, and the corresponding strengths can be seen in Example 26.

TABLE 2

(on weight percent basis)

| Sample No. | $SiO_2$ | $Al_2O_3$ | CaO | MgO | $Fe_2O_3$ |
|---|---|---|---|---|---|
| Sample 1 | 61.54 | 12.68 | 21.51 | 1.55 | 1.26 |
| Sample 2 | 38.75 | 14.63 | 36.25 | 6.65 | 0.78 |
| Sample 3 | 28.16 | 12.45 | 54.46 | 2.26 | 1.55 |

2. According to chemical composition of fly ash and the intended amount of calcium oxide in the ash slag, a lime was added into the ash slag discharged out after coal being burnt, so as to make the chemical composition, mainly calcium oxide content, of the fly ash mixture to reach the intended values (namely "adding calcium in the slag" method), then partially or entirely melted the mixture of the fly ash and lime, then rapidly cooling (water-quenching) the mixture. By changing the added amounts of lime, a series of the samples having different contents of calcium oxide were obtained. The representative chemical compositions are listed in Table 3, and the corresponding strength data are shown in Example 27.

TABLE 3

(on weight percent basis)

| Sample No. | $SiO_2$ | $Al_2O_3$ | CaO | MgO | $Fe_2O_3$ |
|---|---|---|---|---|---|
| Sample 4 | 62.75 | 13.63 | 20.25 | 2.4 | 0.78 |
| Sample 5 | 36.85 | 15.95 | 35.97 | 7.85 | 1.48 |
| Sample 6 | 26.16 | 10.45 | 55.2 | 3.26 | 1.55 |

3. A great number of experimental studies were made by using directly water-quenched slag and steel slag from metallurgical industry.

According to a great number of experimental studies, the inventors further understood that, the rapid-cooled slags coming from metallurgy industry, firepower industry and chemical industry, are mainly micro-crystal and amorphous vitreous materials, because their crystals do not have a chance to grow. These micro-crystal and amorphous vitreous materials, have high free energy and many structural defects, and test experimentation demonstrates that they have good potential hydro-hardening ability (see Example 26 and Example 27). Such slags are important starting materials of the sialite binary wet cement of the present invention. Therefore, the industrial boilers using coal (including coke, fine coal, slurry coal, lump coal or coal gangue) as fuel, such as the boilers of thermal power plants, coal chemical industry (including coal gasification, coal liquefaction), and various industrial boilers, blast furnace, fluidized-bed, are added some calcium-rich substance (including quick lime, slaked lime and lime stone) and a small amount of mineralizing agents (such as iron powders, calcium fluoride) in the burning process or before the burning process or in the process of deslagging or in the process of deslagging and treatment. Through partially or wholly melting the slag by utilizing residual heat or supplementary heating means, then through a rapidly cooling process (wind cooling or water-quenching cooling), microcrystal and amorphous materials are obtained. This is one important part of the present invention.

(C) Production Process of the Sialite Binary Wet Cement

The production process of the sialite binary wet cement is different from that of the traditional cement, and the basic difference is that the crushing and milling of the starting materials are conducted in water medium not in air, and the manufacture is finished in a wet state (slurry, paste, wet powder). The process is quite flexible, for Example, the starting materials can first be wet-crushed and wet-milled respectively, then mixed and homogenized according to proportioning ratio, or alternatively the starting materials can first be formulated respectively according to grindability, then wet-crushed and wet-milled, finally mixed and homogenized to obtain slurry and paste which do not need further dry treatment, namely these are the obtained products. They can be used to manufacture concrete immediately or be packaged in bags for, storage and transportation for further usage.

The process and method of production, transportation and package of the "female body" include:

The starting materials were not dried, and were crushed directly and milled into a slurry after being mixed with regulating agents (or not using regulating agents) and water. The proper regulating agent can be added in production process according to the particular need, also can be added after manufacture of slurry, and the slurries need store and transport separately. The milling degree of fineness is rendered a specific surface area of 2800-7500 $cm^2/g$; the better degree of fineness is rendered a specific surface area of 4000-5000 cm²/g; the storage period can be adjusted from several days to several years. Water content is no restricted in principle, and it can be 0.1-95% by weight, preferably 10-80% by weight, mostly preferably 25-70% by weight. The crushing and milling method of starting materials can be controlled flexibly. The starting materials can first be wet-crushed and wet-milled respectively, then were mixed and homogenized according to the proportioning ratio; or the starting materials can first be formulated respectively according to their grindability, and then were wet-crushed and wet-milled, and finally were homogenized. In the whole processes, the dewatering equipment or watering equipment can be equipped. After wet-crushed, wet-milled and homogenized, the obtained "slurry, paste, wet powder" materials can be used directly to manufacture concrete, or be packaged, transported and stored for further use. The transportation and package can use bulk cement tank-cars, or various packages forms such as recycle barrel or tank having various sizes, or disposable polymer bags or weaving bags etc.

The process and method of production, transportation and package of the "male body" include following two types:

(1) The starting materials for dry-milling are dried, crushed, and milled with or without usage of regulating agents to form a dry powder. The powder has a fineness which renders a specific surface area of 2800-7500 cm²/g. A preferable fineness is rendered a specific surface area of 4000-5000 cm²/g. The powders should be stored and transported separately. The regulating agents can be added in the manufacturing process as required, or added after the manufacturing process as required.

(2) The starting materials for wet-milling are not dried, then are crushed and milled into wet slurry by adding water and with or without the usage of regulating agents. The slurry has a fineness which is rendered a specific surface area of 2800-7500 cm²/g. a preferable fineness is rendered a specific surface area of 4000-5000 cm²/g. The regulating agents can be added during the manufacturing process as required, or added after the slurry was produced as required. The slurries are stored and transported separately. When a wet-milling is used, the storing period can be adjusted from several days to several years. Water content of the "male body" is not restricted in principle, it can be 1-95% by weight, preferably 15-85% by weight, more preferably 25-70% by weight. In wet-milling, the process can be controlled flexibly, and the starting materials can be wet-crushed and wet-milled separately, then mixed and homogenized in a specific ratio; or the starting materials can first be formulated respectively according to their grindability, and then wet-crushed and wet-milled, finally homogenized. A dewatering equipment can be equipped. After wet-crushed, wet-milled and homogenized, the obtained "slurry, paste, wet powder" materials can be used directly to manufacture concrete, or be packaged, transported and stored for further use. The transportation and package can use bulk cement tank-cars, or various packages forms such as recycle barrel, tank having various sizes, disposable polymer bags or weaving bags etc.

The stated regulating agents of the sialite binary wet cement can be added into "female body" or into "male body" or into both of them.

(D) Equipment Used for Producing the Sialite Binary Wet Cement

Figure 2:
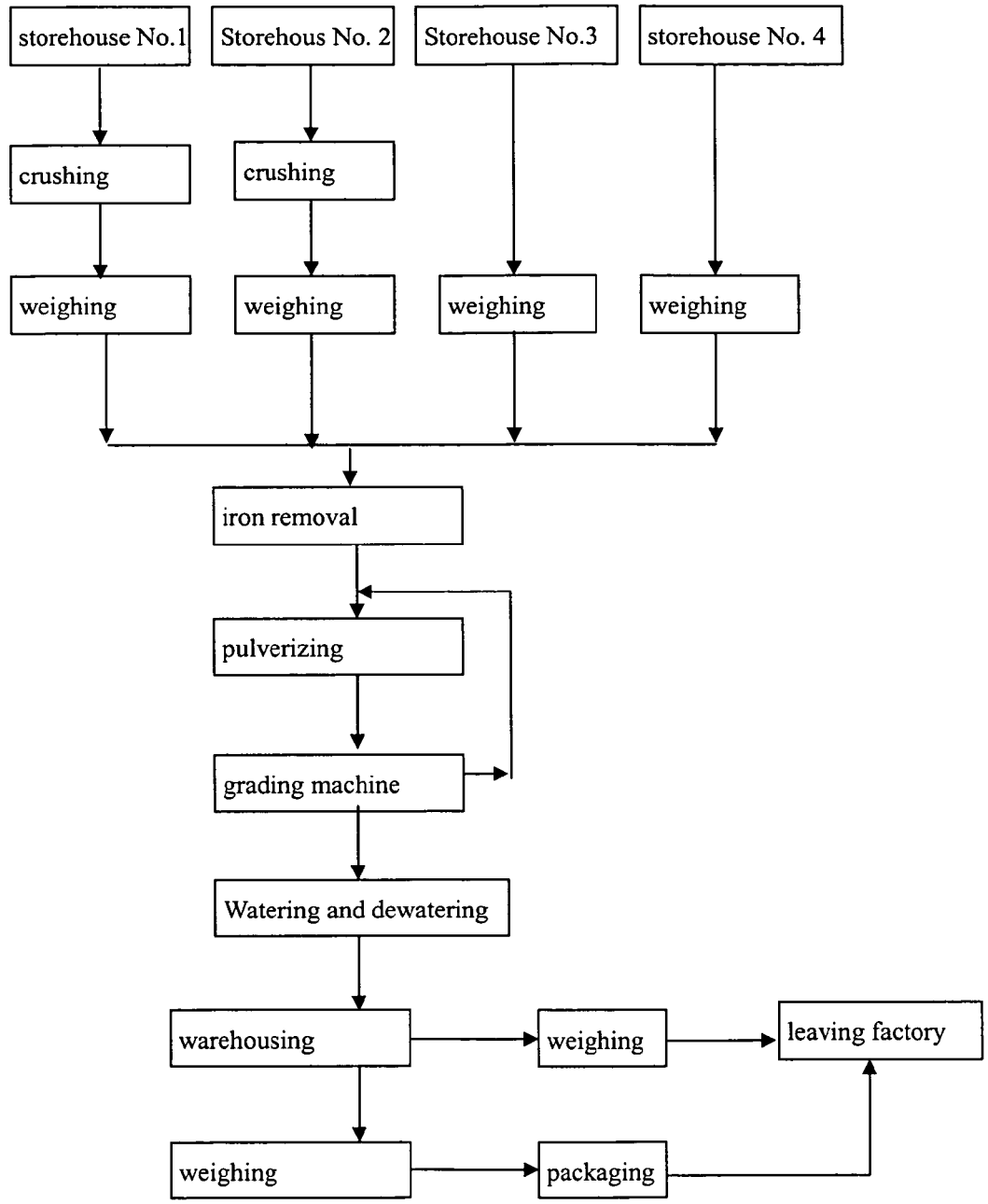
FIG. 2 is a flowchart graph for producing the "male body" of the sialite binary wet cement.

Under the premise of satisfying the demanded specific surface area, various combination of machines suitable to wet-crushing and wet-milling can be selected, such as the machine combination formed by one, two or three of roll mill, disc mill and ball mill, see FIG. 1 and FIG. 2. The production scale can be big or small so as to satisfy the need of the large-scale production, and the small-scale production according to the needed quantity. If necessary, dewatering equipment or watering equipment can be equipped. If the producing scale is small, the needed cost of producing equipment of the binary wet cement is low, so that it can suit measures to different conditions, and it need not devote a great deal of capital to establish large-scale enterprise, and that it is benefit to harness industrial solid waste slags in large-scale.

(E) The Using Method of the Sialite Binary Wet Cement

When being used, the "male body" and "female body" are needed to be mixed together so as to interact each other, and then can cause hydration reaction and chemical reaction (including liquid phase reaction, solid phase reaction) to form concreting substance (including crystal type, gel type, network type or their mixture), and finally to form a sialite. The following is to give a relevant examples.

In the usage of building, the sialite binary cement can produce concrete by mixing it with aggregate and water and agitating them, and the method is as same as that of the ordinary concrete. The aggregate for producing concrete is composed of one or more selected from the mountain sand, river sand, sea sand, gobi sand, milled sand, crushed rock, bulk rock, waste rock, mine tailing rock, clay, mine classified sand, whole mineral tailings and industrial waste slag. The produced concrete can be used in building, irrigation works, communication, underground engineering etc.

In the usage of mineral backfill, timbering, separating wind and stopping leak, roadbed reinforcement, the sialite binary wet cement has very strong solidifying ability to the sand soil having high clay content except having the same application like the ordinary cement, and is much suitable to be used to mine backfill, timbering, separating wind and stopping leak, roadbed reinforcement and so on.

Because now cement is used as a cementitious material for backfilling in mines, the setting time is long, the backfilling strength is low, and the backfill cost is high. Because the backfill cost is high, the exploited spaces of most of the mines do not be backfilled, and thus the spaces will collapse naturally, so that it results in the land subsidence, underground water pollution, destroy of the ground constructions and environment, and even results in a disaster.

When using traditional cement as cementing material, the classified sand mine tailing is used generally as a backfill material. The fine sand (having a particle size of less than 37 μm) cannot be used, and need to be sent to mine tailing storehouse, which increases the difficulty of dam stacking and raises the expense for constructing mine tailing storehouse. In the mine ore that has high grade and low mine tailing ratio, the backfill aggregate is seriously insufficient and is recruited using milling sand or outsourcing bought sand so that the backfill cost increases further. If the sialite binary cement of the present invention is used as backfill material, the mine tailing needs not be classified. It can solidify the fine mine tailing sand and fine mud together so that the backfill cost greatly deceases. The method and process are:

(1) Mixing the sialite binary cement together with water or together with both of water and the added aggregate or together with the slurry containing the added aggregate respectively to manufacture a backfill slurry, in which content of the sialite binary cement as a cementing agent is 2-15% of that of backfill slurry.

(2) The backfill slurry is made to a concentration of 35-87% by weight, preferably 60-85% by weight.

(3) Sending the manufactured backfill slurry to the backfill position through flowing automatically or by pumping.

(F) EXAMPLE

In FIG. 1, the storehouse No. 1 is used to store various water-quenching slag with amorphous or/and microcrystal structure, such as ironmaking slag, phosphorus mineral slag, titanium mineral slag, manganese mineral slag, fluorite mineral slag; the storehouse No. 2 is used to store the following materials: steel slag, blast furnace slag, fly ash, waste glass, coal-burning boiler slag; or natural mineral shale, clay, coal gangue calcined and dewatered at the temperature 500-1000 degrees Celsius; or the factory waste products using clay as main component and sintered at a certain temperature, such as waste bricks, waste tiles, waste ceramics; or the mixing materials, or pozzolana materials, pearlite rock, turpentine rock, obsidian, pumice, shale, coal gangue, limestone, sand stone, quartz-sand, clay, natural zeolite, pumice, various mineral mine tailing, silica fume or the amorphous and microcrystal substances that are obtained from boilers and power plants using fine coal as fuel, through adding calcium-rich substance (including quick lime, slaked lime, limestone) and a small amount of mineralizing agents into the fine coal, slurry coal or bulk coal, and wind cooling or water-quenching the burned residual products when or after they departed the hearth or after they are melted; or the amorphous and microcrystal substances that are obtained from boilers, blast furnace, fluidized-bed and thermal power plants using bulk coal as fuel, adding calcium-rich substance (including quick lime, slaked lime, limestone) and a small amount of mineralizing agents into the bulk coal, and air wind cooling or water-quenching cooling the burned residual products when they departed from the hearth or after they are melted, or the amorphous and microcrystal substances that are obtained in the process of manufacturing oil by coal, through adding calcium-rich substance and a small amount of regulating agents into fine coal, slaked coal or bulk coal, and wind cooling or water-quenching the burned residual products after they departed from the hearth or melted.

Figure 4:
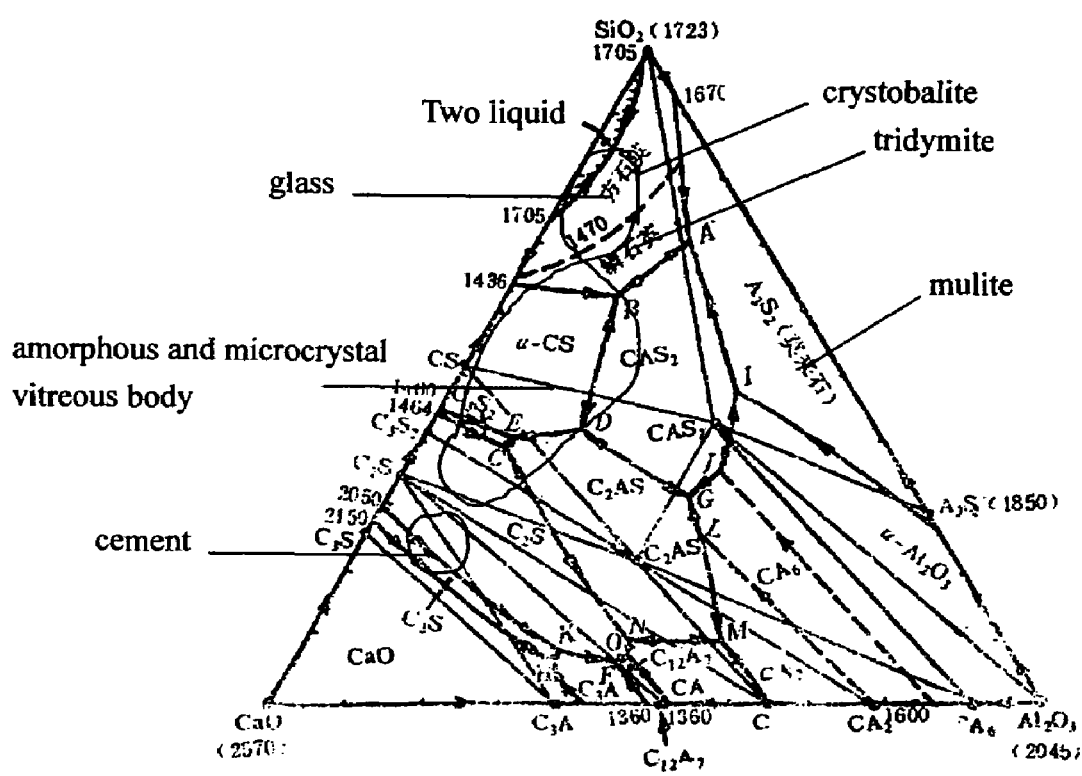
FIG. 4 is a ternary phase diagram for $CaO-Al_2O_3-SiO_2$ system.

The substances in storehouses No. 1 and No. 2 are the main starting materials of the "female body". Virtually, they are the substances which have potential hydro-hardening activity and microcrystal or/and amorphous structure, and are obtained through mixing several inorganic materials in certain ratios, milling and calcining them, letting their compositions to be between Portland cement and glass in the ternary phase diagram of $CaO-Al_2O_3-SiO_2$ (see FIG. 4), then melting and rapidly cooling them (wind cooling or water-quenching cooling).

Figure 3:
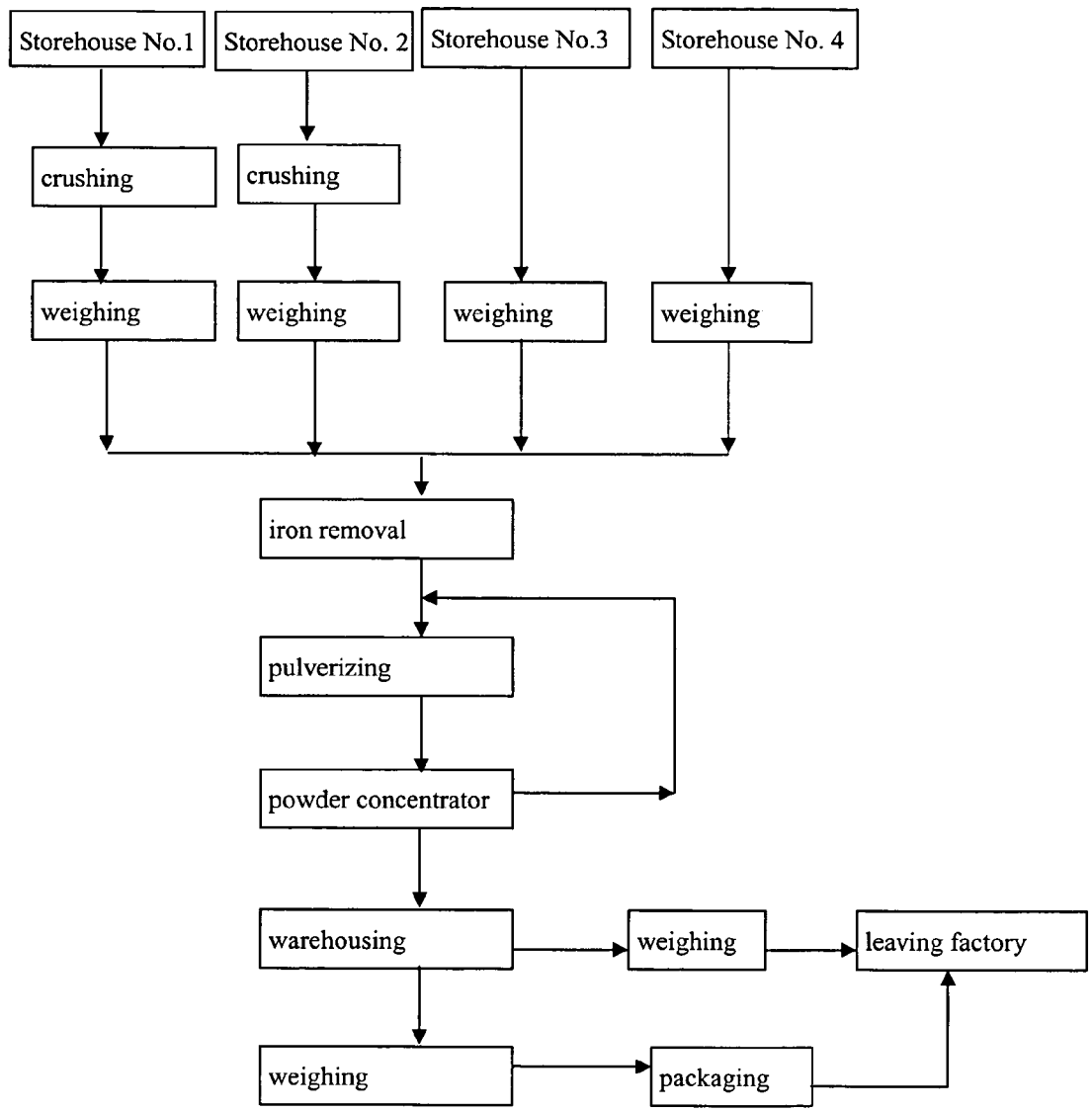
FIG. 3 is a flowchart graph for producing the "male body" of the sialite binary wet cement by dry-milling method.

The storehouses No. 1 and No. 2 in FIG. 2 and FIG. 3 are used to store one of the natural anhydrite, dihydrate gypsum, hemihydrate gypsum, chemical industry gypsum (phosphogypsum, fluorogypsum, salt gypsum), lime, calcium hydroxide, chemical industry lime, alkali materials, various cement clinker, various cement or their mixtures, which are the main starting materials of the "male body".

The process of manufacturing the sialite binary wet cement also includes:

(1) The wet-crushing and wet-milling equipment can be set up at the concrete workstation, so that crushing and milling can be conducted at the moment when they are needed. They need not be stored for long period, and do not cause the problem of grade reduce or failure of the cement, and need not build the rainproof and waterproof construction, and do not need special preservation, and thus saving labor, saving material, and reducing cost.

(2) The crushing and milling equipment can also be set up near the starting material resource or the work site. It just needs to transport the starting materials or the sialite binary wet cement packaging in bags in short distance, greatly saving material circulation cost and the occupation of transporting resource.

The following is to describe particularly flowchart graph for producing the sialite binary wet cement.

1. Flowchart graph for producing the "female body" of the sialite binary wet cement is shown in FIG. 1.

Storehouse No. 1 is used to store the materials having a particle size of less than 20 mm, such as water-quenching slag; storehouse No. 2 is used to store the materials having a particle size of greater than 20 mm, such as coal gangue; storehouse No. 3 is used to load a regulating agent; storehouse No. 4 (or container) is to load water. The production flowchart comprises the following steps:

(1). According to proportioning requirements, the materials from storehouse No. 2 were crushed, then the crushed materials, the starting materials of storehouse No. 1, regulating agent of storehouse No. 3 and water of storehouse No. 4 were weighed respectively, and then past through an iron removal apparatus;

(2). Removing iron from the materials by using the iron removal apparatus and then sending the materials into a mill;

(3). Mixing thoroughly and uniformly the materials during water-milling process and milling the materials into a fine slurry, and then sending the slurry to a spiral classifier;

(4) The spiral classifier sent back non-levigated materials out of the slurry to the mill for milling them again, and sent the levigated slurry to watering and dewatering apparatus (which adds water to the slurry or removes water from the slurry according to specific requirement);

(5). The slurry in the watering and dewatering apparatus was added water thereinto or removed water therefrom, and then entered into a warehouse; and (6). The slurry in the warehouse was weighed and then sent to a ladle car, and left factory without packing. Or alternatively, the slurry may be weighed and then packed before leaving factory.

2. Flowchart graph for producing the "male body" of the sialite binary wet cement is shown in FIG. 2.

Storehouse No. 1 is used to load the materials having a particle size of greater than 20 mm such as gypsum; storehouse No. 2 is used to load the materials having a particle size of greater than 20 mm such as steel slag; storehouse No. 3 is used to load a regulating agent; and storehouse No. 4 is used to load water. The production flowchart comprises the following steps:

(1). According to proportioning requirements, the materials from storehouse No. 1 and storehouse No. 2 were crushed, then the crushed materials, regulating agent of storehouse No. 3 and water of storehouse No. 4 were weighed respectively, and past through an iron removal apparatus;

(2). Removing iron from the materials by using the iron removal apparatus and then sending the materials into a mill;

(3). Mixing thoroughly and uniformly the materials during water-milling process, and milling the materials into a fine slurry, and then sending the slurry to a spiral classifier;

(4) The spiral classifier sent back the non-levigated materials out of the slurry to the mill for milling them again, and sent the levigated slurry to watering and dewatering apparatus (which adds water to the slurry or removes water from the slurry according to specific requirement);

(5). The slurry in the watering and dewatering apparatus was added water thereinto and removed therefrom, and then entered into a warehouse; and (6). The slurry in the warehouse was weighed and then sent to a ladle car, and left factory without packing. Or alternatively, the slurry may be weighed and then packed before leaving factory.

3. Flowchart graph for producing the "male body" of the sialite binary wet cement by dry-milling manner is shown in FIG. 3.

Storehouse No. 1 is used to load the materials having a particle size of greater than 20 mm, such as steel slag; storehouse No. 2 is used to load the materials having a particle size of greater than 20 mm, such as coal gangue; storehouse No. 3 is used to load grinding aids; storehouse No. 4 used to load the materials having a particle size of less than 20 mm. The production flowchart comprises the following steps:

(1). According to proportioning requirements, the materials from storehouse No. 1 and storehouse No. 2 were crushed, then the crushed materials, regulating agent of storehouse No. 3 and materials of storehouse No. 4 were weighed respectively, and past through an iron removal apparatus.

(2). Removing iron from the materials by using the iron removal apparatus, and then sending the materials into a mill.

(3). Mixing thoroughly and uniformly the materials during dry-milling process, and milling the materials into a fine powder, and then sending the powder to a powder concentrator.

(4) The powder concentrator sent back non-levigated materials out of the powder to the mill for milling them again, and sent the levigated materials to a warehouse.

(5). The material in the warehouse was weighed, and then sent to a ladle car, and left factory without packing. Or alternatively, the slurry may be weighed and then packed before leaving factory.

Examples of Production Processes of the Sialite Binary Wet Cement

Figure 5:
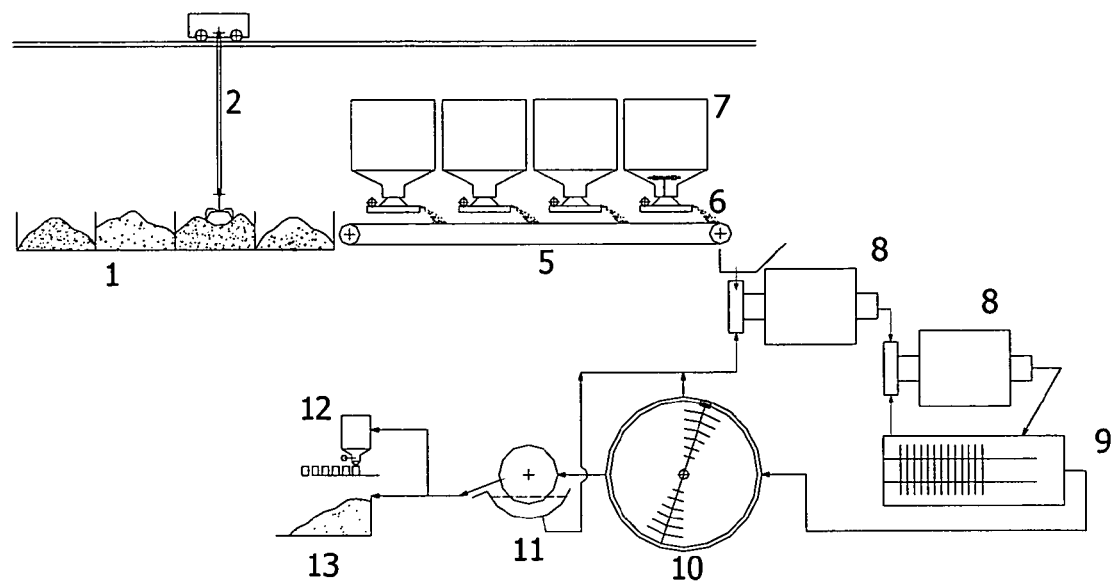
FIG. 5 is a graph showing production process for producing the "female body" of the sialite binary wet cement.

1. Flowchart graph for producing the "female body" of the sialite binary wet cement is shown in FIG. 5.

Process flow for producing the sialite binary wet cement comprises: starting material storage area 1, clampshell crane 2, hammer crusher 3, bucket elevator 4, belt conveyer 5, charge distributor and belt weigher 6, starting material storehouse 7, ball mill 8, spiral classifier 9, enriching machine 10, ceramic filter 11, finished product package line 12, bulk finished product package line 13. The production flowchart comprises the following steps:

(1) Clampshell crane sent the various starting materials respectively from the starting material storage areas to corresponding storehouses for backup.

(2) Storehouses used charge distributors and belt weighers to formulate a mixture in a specific proportion, and belt conveyer sent the mixture to a first-stage mill, and at the same time a given amount of water was supplied to the mill by a pipeline.

(3) The slurry material discharged from the first-stage mill was sent directly to entrance of second-stage mill. The second-stage mill and spiral classifier formed a closed system. The spiral classifier separated the coarse grains and then sent them back to entrance of the second-stage mill for milling once again. The fine grain materials past through overflow weir of the spiral classifier and were sent directly to an enriching machine.

(4) After concentrated by the enriching machine, the slurry having high concentration was sent to a ceramic filter for further dewatering, and thus a paste having a water content of 12-35% was obtained, namely the paste is the "female body" of the sialite binary wet cement. Overflow water of the enriching machine together with water from the filter were sent back to the first-stage mill for reutilization.

(5) The "female body" of the sialite binary wet cement was packaged or stored at a storage area for finished bulk product.

Figure 6:
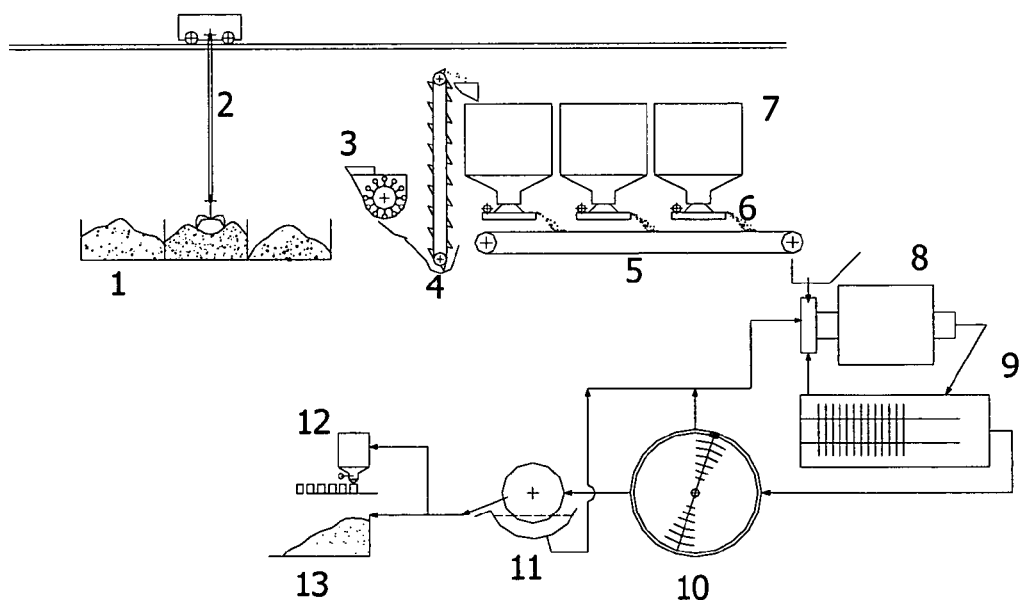
FIG. 6 is a graph showing production process for producing the "male body" of the sialite binary wet cement.

2. Flowchart graph for producing the "male body" of the sialite binary wet cement is shown in FIG. 6.

(1) Clampshell crane sent the various starting materials batchwisely from the starting material storage areas to hammer crusher for being crushed. The crushed materials were lifted to a distribution belt by a bucket elevator, and were sent to corresponding storehouses for backup.

(2) Storehouses used charge distributors and belt weighers to formulate a mixture in a specific proportion, and a belt conveyer sent the mixture to a mill, and at the same time a given amount of water was supplied continuously to the mill by a pipeline.

(3) The mill and spiral classifier formed a closed system. The spiral classifier separated the coarse grains and then sent them back to entrance of the second-stage mill for milling once again. The fine grain materials past through overflow weir of the spiral classifier and were sent directly to an enriching machine.

(4) After concentrated by the enriching machine, the slurry having high concentration was sent to a ceramic filter for further dewatering, and thus a paste having a water content of 12-35% was obtained, namely the paste is the "male body" of the sialite binary wet cement. Overflow water of the enriching machine together with water from the filter were sent back to the mill for reutilization.

(5) The "male body" of the sialite binary wet cement was packaged or stored at a storage area for finished bulk product.

The present invention is further illustrated by the following examples.

Example 1

Comparison tests between dry-milling and wet-milling of metallurgical slag in A region were taken.

Using same test small mills ($\phi 500*500$ mm), and same milling time, test results were as follows: when dry-milling type was chosen, 5 kg starting materials were used, a specific surface area of 3900 $cm^2/g$ was obtained; whereas when wet-milling type was chosen, 7.5 kg starting materials and 3.75 kg water were mixed and milled, and a specific surface area of 4000 $cm^2/g$ was obtained. It can be seen that, in the case where the materials having approximately same fineness are obtained, wet-milling efficiency is 150% or more of dry-milling efficiency.

Example 2

Comparison tests between dry-milling and wet-milling of the same metallurgical slags as used in Example 1 were taken.

Using same test small mills, and same milling time, when dry-milling type was chosen, 5 kg starting materials were used, a specific surface area of 3900 $cm^2/g$ was obtained; whereas when wet-milling type was chosen, 5 kg starting materials and 2.5 kg water were mixed and milled, and a specific surface area of 4800 $cm^2/g$ was obtained. It can be seen that, in the case where same milling time is used to mill the materials having same weights, the finesses obtained by the wet-milling is much higher than the finesses obtained by the dry-milling.

Example 3

Cement mortar comparison tests between the sialite binary wet cement of the present invention, and 42.5 grade and 52.5 grade Portland cement were made. In these tests, the following test standards were quoted: TEST METHODS FOR WATER REQUIREMENT FOR NORMAL CONSISTENCY, SETTING TIME AND SOUNDNESS OF THE PORTLAND CEMENTS (GB1346-89), TEST METHOD FOR FINENESS OF CEMENT (GB1345-91), TEST METHOD FOR STRENGTH OF HYDRAULIC CEMENT MORTAR (ISO method) (GB/T17671-1999). The testing results are shown in Table 4 and Table 5.

TABLE 4 physical property of the sialite binary wet cement

| Grades | Volume stability | Fineness (%) 0.08 mm standard sieve triage | setting time (h:min) initial setting | final setting |
|---|---|---|---|---|
| 42.5 grade Portland cement | acceptable | 3.85 | 3:20 | 4:55 |
| 52.5 grade Portland cement | acceptable | 3.5 | 2:50 | 4:43 |
| wet cement | acceptable | 3.25 | 3:10 | 5:50 |

TABLE 5

Mechanical property of the sialite binary wet cement

| | flexural strength (Mpa) | | compression strength (Mpa) | |
|---|---|---|---|---|
| Grades | 3 d | 28 d | 3 d | 28 d |
| 42.5 grade Portland cement | 4.2 | 7.1 | 17.2 | 45.5 |
| 52.5 grade Portland cement | 4.5 | 7.9 | 24.6 | 53.9 |
| wet cement | 7.8 | 10.6 | 32.3 | 68.9 |

In the above Table 3 and Table 5, in the wet cement, the "female body" comprises (on dry weight basis) slag 70%, steel slag 10%; and the "male body" comprises (on dry weight basis) anhydrite 14%, lime 6%. The produced "female body" has a specific surface area of 4000 cm²/g, and the produced "male body" has a specific surface area of 4000 cm²/g.

It can be seen from the data shown in Table 4 and Table 5 for this Example, the sialite binary wet cement of the present invention meets the various national testing standards for Portland cement, and its intensity index reaches to 62.5-MPa or more.

The following Examples 4-27 described performance index of the mortar obtained by using the sialite binary wet cement of the present invention, stored for different periods under different conditions as a cement material, and adjusting water addition amount so as to have that wet cement (on dry weight basis):standard sand:water=1:3:0.5. In these tests, the following test standards were quoted: TEST METHODS FOR WATER REQUIREMENT FOR NORMAL CONSISTENCY, SETTING TIME AND SOUNDNESS OF THE PORTLAND CEMENTS (GB1346-89), TESTING METHOD FOR SPECIFIC SURFACE OF CEMENT (Blaine method) (GB8074-87), TEST METHOD FOR CEMENT STRENGTH (ISO METHOD) (GB/T17671-1999).

The "female body" used in Examples 4-9 is the produced "female body" samples stored for 3 days.

The "female body" used in Examples 10-15 is the produced "female body" samples stored for 3 months.

The "female body" used in Examples 16-21 is the produced "female body" samples stored for 6 months.

Example 4

Strength data for the mortar formed by the wet cement are shown in Table 6. In the wet cement (on dry weight basis), the "female body" comprises slag 45%, steel slag 28.1%, fly ash 10%, and the "male body" comprises phosphogypsum 9%, lime 6%. The produced "female body" has a specific surface area of 4000 cm²/g, and the produced "male body" has a specific surface area of 4000 cm²/g.

Example 5

Strength data for the mortar formed by the wet cement are shown in Table 6. In the wet cement (on dry weight basis), the "female body" comprises slag 60%, blast furnace slag 34.8%, borax 0.3%, citric acid 0.1%, and the "male body" comprises phosphogypsum 3%, lime 7%. The produced "female body" has a specific surface area of 4500 cm²/g, and the produced "male body" has a specific surface area of 4000 cm²/g.

Example 6

Strength data for the mortar formed by the wet cement are shown in Table 6. In the wet cement (on dry weight basis), the "female body" comprises slag 55%, phosphorus mineral slag 12.6%, coal gangue 25%, and the "male body" comprises fluorogypsum 5%, lithium chloride 0.4%, and sodium hydroxide 1.5%. The produced "female body" has a specific surface area of 4000 cm²/g, and the produced "male body" has a specific surface area of 4000 cm²/g.

Example 7

Strength data for the mortar formed by the wet cement are shown in Table 6. In the wet cement (on dry weight basis), the "female body" comprises slag 45%, titanium mineral slag 16.8%, honey 0.1%, tartaric acid 0.15%, citric acid 0.05%, and the "male body" comprises dihydrate gypsum 20%, chemical industry lime 12%, sulphoaluminate cement 3%, lithium hydroxide 0.4%, sodium carbonate 1%, calcium chloride 1.5%. The produced "female body" has a specific surface area of 4000 cm²/g, and the produced "male body" has a specific surface area of 4000 cm²/g.

Example 8

Strength data for the mortar formed by the wet cement are shown in Table 6. In the wet cement (on dry weight basis), the "female body" comprises slag 45%, sugar 0.1%, citric acid 0.2%, borax 0.1%, and the "male body" comprises gypsum 20%, lime 10%, Portland clinker 22.8%, lithium carbonate 0.3%, water glass 1.5%, sodium chloride 1%. The produced "female body" has a specific surface area of 5000 cm²/g, and the produced "male body" has a specific surface area of 4000 cm²/g.

Example 9

Strength data for the mortar formed by the wet cement are shown in Table 6. In the wet cement (on dry weight basis), the "female body" comprises slag 35%, borax 0.2%, citric acid 0.1%, citric acid 0.1%, and the "male body" comprises phosphogypsum 15%, fluorogypsum 15%, calcium hydroxide 20%, aluminous cement 10.8%, lithium hydroxide 0.3%, sodium carbonate 1.5%, calcium chloride 2%. The produced "female body" has a specific surface area of 5500 cm$^2$/g, and the produced "male body" has a specific surface area of 4000 cm$^2$/g.

TABLE 6

Mechanical property of the sialite binary wet cement

| No | volume stability | flexural strength (Mpa) 3 d | 28 d | compression strength (Mpa) 3 d | 28 d |
|---|---|---|---|---|---|
| Example 4 | acceptable | 6.5 | 9.2 | 21.2 | 57.2 |
| Example 5 | acceptable | 7.1 | 9.5 | 26.9 | 59.7 |
| Example 6 | acceptable | 6 | 9.9 | 27.1 | 61.4 |
| Example 7 | acceptable | 7.5 | 10.8 | 36.8 | 68.2 |
| Example 8 | acceptable | 7.3 | 10.6 | 34.6 | 66.3 |
| Example 9 | acceptable | 6.5 | 9.7 | 27.6 | 52.3 |

Example 10

Strength data for the mortar formed by the wet cement are shown in Table 7. In the wet cement (on dry weight basis), the "female body" comprises slag 45%, steel slag 30%, fly ash 9.3%, sugars 0.01%, citrate 0.02%, lignosulphonate 0.02%, and the "male body" comprises phosphogypsum 8%, lime 7%, lithium chloride 0.5%, dissolvable carbonate 0.1%, lignosulphonate 0.05%. The produced "female body" has a specific surface area of 4000 cm$^2$/g, and the produced "male body" has a specific surface area of 4000 cm$^2$/g.

Example 11

Strength data for the mortar formed by the wet cement are shown in Table 7, in the wet cement (on dry weight basis), the "female body" comprises slag 60%, zeolite 20.5%, honeys 0.05%, citric acid 0.01%, tartaric acid 0.01%, and the "male body" comprises phosphogypsum 14%, lime 5%, lithium carbonate 0.4%, sodium hydroxide 0.03%. The produced "female body" has a specific surface area of 4500 cm$^2$/g, and the produced "male body" has a specific surface area of 4000 cm$^2$/g.

Example 12

Strength data for the mortar formed by the wet cement are shown in Table 7, in the wet cement (on dry weight basis), the "female body" comprises slag 55%, phosphorus mineral slag 10%, fly ash 9.4%, citric acid 0.03%, boric acid 0.02%, and the "male body" comprises fluorogypsum 6%, lime 14%, Portland cement 5%, lithium hydroxide 0.5%, sugars 0.05%. The produced "female body" has a specific surface area of 4000 cm$^2$/g, and the produced "male body" has a specific surface area of 4000 cm$^2$/g.

Example 13

Strength data for the mortar formed by the wet cement are shown in Table 7, in the wet cement (on dry weight basis), the "female body" comprises slag 50%, titanium mineral slag 16.5%, tartrate 0.03%, lignosulphonate 0.1%, and the "male body" comprises dihydrate gypsum 16%, chemical industry lime 12%, sulphoaluminate cement 5%, lithium carbonate 0.3%, citric acid 0.07%. The produced "female body" has a specific surface area of 4000 cm$^2$/g, and the produced "male body" has a specific surface area of 4000 cm$^2$/g.

Example 14

Strength data for the mortar formed by the wet cement are shown in Table 7, in the wet cement (on dry weight basis), the "female body" comprises slag 45%, lignosulphonate 0.03%, borax 0.17%, and the "male body" comprises gypsum 29.3%, lime 20%, Portland clinker 5%, lithium chloride 0.4%, citric acid 0.1%. The produced "female body" has a specific surface area of 5000 cm$^2$/g, and the produced "male body" has a specific surface area of 4000 cm$^2$/g.

Example 15

Strength data for the mortar formed by the wet cement are shown in Table 7, in the wet cement (on dry weight basis), the "female body" comprises slag 25%, tartaric acid 0.08%, boric acid 0.02%, and the "male body" comprises phosphogypsum 15%, fluorogypsum 15%, calcium hydroxide 25%, aluminous cement 9.4%, sugars 0.1%, lithium hydroxide 0.4%. The produced "female body" has a specific surface area of 5500 cm$^2$/g, and the produced "male body" has a specific surface area of 4000 cm$^2$/g.

TABLE 7

Mechanical property of the sialite binary wet cement

| No. | volume stability | flexural strength (Mpa) 3 d | 7 d | compression strength (Mpa) 3 d | 28 d |
|---|---|---|---|---|---|
| Example 10 | acceptable | 8.4 | 11.5 | 42.2 | 78.1 |
| Example 11 | acceptable | 8 | 11 | 38.3 | 76.5 |
| Example 12 | acceptable | 8.2 | 10.7 | 36.7 | 72.3 |
| Example 13 | acceptable | 7.8 | 10.5 | 35.6 | 69.1 |
| Example 14 | acceptable | 7.5 | 10.4 | 34.3 | 66.9 |
| Example 15 | acceptable | 4.6 | 7.9 | 20.9 | 43.1 |

Example 16

Strength data for the mortar formed by the wet cement are shown in Table 8. In the wet cement (on dry weight basis), the "female body" comprises slag 40%, steel slag 30%, fly ash 13.5%, sugars 0.1%, lignosulphonate 0.25%, and the "male body" comprises phosphogypsum 13%, lime 2%, sodium hydroxide 0.5%, lithium carbonate 0.6%, lignosulphonate 0.05%. The produced "female body" has a specific surface area of 4000 cm$^2$/g, and the produced "male body" has a specific surface area of 4000 cm$^2$/g.

Example 17

Strength data for the mortar formed by the wet cement are shown in Table 8. In the wet cement (on dry weight basis), the "female body" comprises slag 60%, blast furnace slag 13.8%, honeys 0.15%, tartaric acid 0.15%, and the "male body" comprises phosphogypsum 18%, lime 7%, lithium chloride 0.7%, dissolvable carbonate 0.2%. The produced "female body" has a specific surface area of 4500 cm$^2$/g, and the produced "male body" has a specific surface area of 4000 cm$^2$/g.

Example 18

Strength data for the mortar formed by the wet cement are shown in Table 8. In the wet cement (on dry weight basis), the "female body" comprises slag 50%, phosphorus mineral slag 18.8%, fly ash 5%, citric acid 0.2%, boric acid 0.15%, and the "male body" comprises fluorogypsum 10%, lime 10%, Portland cement 5%, sugars 0.15%. The produced "female body" has a specific surface area of 4000 cm$^2$/g, and the produced "male body" has a specific surface area of 4000 cm$^2$/g.

Example 19

Strength data for the mortar formed by the wet cement are shown in Table 8. In the wet cement (on dry weight basis), the "female body" comprises slag 50%, titanium mineral slag 14%, tartrate 0.2%, lignosulphonate 0.2%, and the "male body" comprises dihydrate gypsum 20%, chemical industry lime 12%, sulphoaluminate cement 3%, lithium hydroxide 0.5%, honeys 0.1%. The produced "female body" has a specific surface area of 4000 cm$^2$/g, and the produced "male body" has a specific surface area of 4000 cm$^2$/g.

Example 20

Strength data for the mortar formed by the wet cement are shown in Table 8. In the wet cement (on dry weight basis), the "female body" comprises slag 44.1%, lignosulphonate 0.3%, borax 0.2%, and the "male body" comprises gypsum 35%, lime 15%, Portland clinker 4.8%, lithium hydroxide 0.5%, tartaric acid 0.1%. The produced "female body" has a specific surface area of 5000 cm$^2$/g, and the produced "male body" has a specific surface area of 4000 cm$^2$/g.

Example 21

Strength data for the mortar formed by the wet cement are shown in Table 8. In the wet cement (on dry weight basis), the "female body" comprises slag 35%, lignosulphonate 0.1%, tartaric acid 0.1%, boric acid 0.02%, and the "male body" comprises phosphogypsum 10%, fluorogypsum 20%, calcium hydroxide 20%, aluminous cement 15%, lithium chloride 0.6%, citric acid 0.18%. The produced "female body" has a specific surface area of 5500 cm$^2$/g, and the produced "male body" has a specific surface area of 4000 cm$^2$/g.

TABLE 8

Mechanical property of the sialite binary wet cement

| No. | volume stability | flexural strength (Mpa) 3 d | 7 d | compression strength (Mpa) 3 d | 28 d |
|---|---|---|---|---|---|
| Example 16 | acceptable | 8.1 | 10.9 | 39.6 | 77.2 |
| Example 17 | acceptable | 7.6 | 11.2 | 36.5 | 75.7 |
| Example 18 | acceptable | 8.1 | 11.5 | 36.8 | 71.4 |
| Example 19 | acceptable | 7.3 | 10.6 | 35.9 | 68.2 |
| Example 20 | acceptable | 7.5 | 10.3 | 33.7 | 66.3 |
| Example 21 | acceptable | 6.2 | 9.5 | 26.4 | 52.3 |
| Example 22 | acceptable | 8.2 | 10 | 46.8 | 74.8 |

The following is to describe the working examples for obtaining the mortars having different starting materials and different proportioning.

Example 22

Strength data for the mortar formed by the wet cement are shown in Table 9. In the wet cement (on dry weight basis), the "female body" comprises slag 49.15%, steel slag 40%, tartaric acid 0.3%, boric acid 0.05%, and the "male body" comprises lithium carbonate 0.5%, water glass 10%. The produced "female body" has a specific surface area of 4500 cm$^2$/g, and the produced "male body" has a specific surface area of 4000 cm$^2$/g.

Example 23

Strength data for the mortar formed by the wet cement are shown in Table 9. In the wet cement (on dry weight basis), the "female body" comprises burned coal gangue 80%, lignosulphonate 0.1%, tartaric acid 0.1%, and the "male body" comprises water glass 18%, lithium chloride 0.3%, sodium chloride 1.5%. The produced "female body" has a specific surface area of 5000 cm$^2$/g, and the produced "male body" has a specific surface area of 4000 cm$^2$/g.

Example 24

Strength data for the mortar formed by the wet cement are shown in Table 9. In the wet cement (on dry weight basis), the "female body" comprises waste brick 78%, citric acid 0.2%, and the "male body" comprises water glass 20%, lithium hydroxide 0.3%, and sodium chloride 1.5%. The produced "female body" has a specific surface area of 5000 cm$^2$/g, and the produced "male body" has a specific surface area of 4000 cm$^2$/g.

Example 25

Strength data for the mortar formed by the wet cement are shown in Table 9. In the wet cement (on dry weight basis), the "female body" comprises phosphorus mineral slag 97%, and the "male body" comprises lime 2.7%, lithium hydroxide 0.3%. The produced "female body" has a specific surface area of 5000 cm$^2$/g, and the produced "male body" has a specific surface area of 4000 cm$^2$/g.

TABLE 9

Mechanical property of the sialite binary wet cement

| No. | volume stability | flexural strength (Mpa) 3 d | 7 d | compression strength (Mpa) 3 d | 28 d |
|---|---|---|---|---|---|
| Example 22 | acceptable | 8.2 | 10 | 46.8 | 74.8 |
| Example 23 | acceptable | 3.8 | 5.9 | 15.6 | 39.2 |
| Example 24 | acceptable | 3.1 | 5.9 | 11.6 | 23.2 |
| Example 25 | acceptable | 4.1 | 6.3 | 14.9 | 31.5 |

Example 26

Strength data for the mortar formed by the wet cement are shown in Table 10. In the wet cement (on dry weight basis), the "female body" comprises Sample 1, Sample 2, Sample 3 shown in Table 2 with a content of 75% respectively, and citric acid 0.2%, and the "male body" comprises gypsum 15%, lime 8%, lithium hydroxide 0.3%, sodium chloride 1.2%, calcium chloride 0.5%. The produced "female body" has a specific surface area of 5000 cm$^2$/g, and the produced "male body" has a specific surface area of 4000 cm$^2$/g.

TABLE 10

Mechanical property of the sialite binary wet cement

| Sample No. | initial setting hour:min | final setting hour:min | stability | flexural strength (MPa) | | compression strength (MPa) | |
|---|---|---|---|---|---|---|---|
| | | | | 3 days | 28 days | 3 days | 28 days |
| Sample 1 | 2:20 | 3:45 | acceptable | 8.1 | 10.2 | 31.2 | 57.2 |
| Sample 2 | 2:10 | 3:25 | acceptable | 7.3 | 11.3 | 35.2 | 69.8 |
| Sample 3 | 2:45 | 5:50 | acceptable | 6.9 | 10.5 | 26.7 | 63.9 |

Example 27

Strength data for the mortar formed by the wet cement are shown in Table 11. In the wet cement (on dry weight basis), the "female body" comprises Sample 4, Sample 5, Sample 6 shown in Table 3 with a content of 75% respectively, and citric acid 0.2%, and the "male body" comprises gypsum 15%, lime 8%, lithium hydroxide 0.3%, sodium chloride 1.2%, calcium chloride 0.5%. The produced "female body" has a specific surface area of 5000 cm$^2$/g, and the produced "male body" has a specific surface area of 4000 cm$^2$/g.

In the wet cement (on dry weight basis), the "female body" comprises slag 65%, blast furnace slag 13.7%, lignosulphonate 0.1%, and the "male body" comprises phosphogypsum 9%, lime 11%, sodium hydroxide 0.8%, lithium carbonate 0.4%. The produced "female body" has a specific surface area of 4500 cm$^2$/g, and the produced "male body" has a specific surface area of 4000 cm$^2$/g.

TABLE 11

Mechanical property of the sialite binary wet cement

| Sample No. | initial setting hour:min | final setting hour:min | stability | flexural strength (MPa) | | compression strength (MPa) | |
|---|---|---|---|---|---|---|---|
| | | | | 3 days | 28 days | 3 days | 28 days |
| Sample 4 | 2:35 | 3:50 | acceptable | 8.45 | 10.4 | 32.5 | 56.2 |
| Sample 5 | 2:5 | 3:30 | acceptable | 7.5 | 11.1 | 36.4 | 70.6 |
| Sample 6 | 2:40 | 5:45 | acceptable | 7.2 | 10.3 | 27.5 | 62.5 |

The following is to describe the situation where the sialite binary wet cement is used for mining backfill.

Example 28

In the following Table 12 is shown river sand strength for mining backfill when using the sialite binary wet cement consolidates the river sand.

TABLE 12

Strength of river sand consolidated by using the sialite binary wet cement

| No. | Soil content in sand (%) | wet cement % | Concentration % | Compression strength (Mpa) | | | | |
|---|---|---|---|---|---|---|---|---|
| | | | | 1 day | 3 days | 7 days | 28 days | 60 days |
| 1 | 10 | 3 | 80 | 0.41 | 0.54 | 0.73 | 1.8 | 2.1 |
| 2 | 15 | 3 | 80 | 0.45 | 0.61 | 0.9 | 2 | 2.4 |
| 3 | 20 | 3 | 80 | 0.48 | 0.65 | 0.96 | 2.2 | 2.45 |
| 4 | 25 | 3 | 80 | 0.51 | 0.68 | 1.2 | 2.4 | 2.5 |
| 5 | 30 | 3 | 80 | 0.6 | 0.7 | 1.4 | 2.6 | 2.8 |
| 6 | 40 | 3 | 80 | 0.59 | 0.71 | 1.45 | 2.6 | 2.78 |

Example 29

In the following Table 13 is shown mine tailings strength for mining backfill when the mine tailings is consolidated by using the sialite binary wet cement.

In the wet cement (on dry weight basis), the "female body" comprises slag 71.4%, blast furnace slag 10%, citric acid 0.1%, boric acid 0.15%, and the "male body" comprises fluorogypsum 10%, lime 8%, lithium chloride 0.3%, citric acid 0.05%. The produced "female body" has a specific surface area of 4500 cm$^2$/g, and the produced "male body" has a specific surface area of 4000 cm$^2$/g.

TABLE 13

Strength of mine tailings consolidated by using the sialite binary wet cement

| No. | Tailings content % | wet cement % | Concentration % | compression strength (Mpa) | | | | |
|---|---|---|---|---|---|---|---|---|
| | | | | 1 day | 3 days | 7 days | 28 days | 60 days |
| 1 | 69 | 3 | 72 | 0.3 | 0.42 | 0.5 | 1.2 | 1.4 |
| 2 | 72 | 3 | 75 | 0.3 | 0.46 | 0.54 | 1.42 | 1.78 |

The following is to describe a method for producing building blocks by using the sialite binary wet cement.

Example 30

Strength data of fly ash consolidated by using the sialite binary wet cement are shown in the following Table 14. A part of the wet cement (on dry weight basis) was homogeneously mixed with fly ash in a ratio of 1:9, water was homogeneously mixed with the other part of the wet cement (on dry weight basis) in a ratio of 0.2:1, and then they were incorporated into a mold, and were subjected to jolt moulding and then curing in a standard curing case. Flexural strength and compression strength of the concrete were measured respectively after being cured for 3 days, 7 days and 28 days. In the wet cement (on dry weight basis), the "female body" comprises slag 45%, steel slag 35%, lignosulphonate 0.3%, borax 0.2%, and the "male body" comprises phosphogypsum 6%, lime 12%, sodium hydroxide 1%, lithium hydroxide 0.4%, tartaric acid 0.1%; The produced "female body" has a specific surface area of 4000 cm$^2$/g, and the produced "male body" has a specific surface area of 4000 cm$^2$/g.

TABLE 14

Strength of fly ash consolidated by using the sialite binary wet cement

| No. | flexural strength (Mpa) | | | compression strength (Mpa) | | |
|---|---|---|---|---|---|---|
| | 3 d | 7 d | 28 d | 3 d | 7 d | 28 d |
| 1 | 1.8 | 2.9 | 3.5 | 4.2 | 8.5 | 11.5 |
| 2 | 2.1 | 3.2 | 3.8 | 5 | 9.4 | 15 |

Example 31

Strength data of fly ash consolidated by using the sialite binary wet cement are shown in the following Table 15. A part of the wet cement (on dry weight basis) was homogeneously mixed with fly ash in a ratio of 1:5, water was homogeneously mixed with the other part of the wet cement (on dry weight basis) in a ratio of 0.2:1, and then they were incorporated into a mold, and were subjected to jolt moulding and then curing in a standard curing case. Flexural strength and compression strength of the concrete were measured respectively after being cured for 3 days, 7 days and 28 days. In the wet cement (on dry weight basis), the "female body" comprises slag 50%, phosphorus mineral slag 26.9%, sugar 0.1%, citric acid 0.2%, and the "male body" comprises phosphogypsum 6%, lime 13%, sodium carbonate 1%, lithium carbonate 0.3%, water glass 1.5%, sodium chloride 1%. The produced "female body" has a specific surface area of 4000 cm$^2$/g, and the produced "male body" has a specific surface area of 4000 cm$^2$/g.

TABLE 15

Strength of fly ash consolidated by using the sialite binary wet cement

| No. | flexural strength (Mpa) | | | compression strength (Mpa) | | |
|---|---|---|---|---|---|---|
| | 3 d | 7 d | 28 d | 3 d | 7 d | 28 d |
| 1 | 3 | 4.9 | 5.2 | 11.1 | 15.3 | 20.6 |
| 2 | 3.2 | 5.1 | 5.4 | 11.5 | 16 | 22 |

Example 32

Strength data of sand soil consolidated by using the sialite binary wet cement are shown in the following Table 16. The wet cement (on dry weight basis) was homogeneously mixed with sand soil, and then they were incorporated into a mold, and were subjected to jolt moulding and then curing in a standard curing case (20□). Flexural strength and compression strength of the concrete measured respectively after being cured for 3 days, 7 days and 28 days. In the wet cement (on dry weight basis), the "female body" comprises slag 60%, steel slag 16.85%, honey 0.15%, tartaric acid 0.1%, and the "male body" comprises fluorogypsum 8%, lime 11%, lithium hydroxide 0.4%, sodium carbonate 1%, calcium chloride 1.5%, water glass 1%. The produced "female body" has a specific surface area of 4000 cm$^2$/g, and the produced "male body" has a specific surface area of 4000 cm$^2$/g.

TABLE 16

Strength of clay consolidated by using the sialite binary wet cement

| No. | soil content in sand (%) | wet cement % | Water content % | compression strength (Mpa) | | | flexural strength (Mpa) | | |
|---|---|---|---|---|---|---|---|---|---|
| | | | | 3 d | 7 d | 28 d | 3 d | 7 d | 28 d |
| 1 | 2 | 10 | 10 | 6.9 | 12 | 17 | 1.8 | 2.9 | 3.7 |
| 2 | 30 | 10 | 10 | 10 | 15 | 20 | 2.3 | 3 | 4 |
| 3 | 50 | 10 | 11 | 11 | 16 | 25 | 2.4 | 3.2 | 4.2 |
| 4 | 80 | 10 | 15 | 7 | 13 | 16 | 2 | 3 | 3.8 |

It can be seen from the above experiments and tests that, the sialite binary wet cement of the present invention is able to substitute the traditional cements for using in building, but also is a good backfill and timbering material, and it can be used for mining backfill and timbering materials, and subgrade strengthening materials, and it has very strong consolidation capacity, especially for sand soil having a high clay content.

What is claimed is:

1. A sialite binary wet cement, characterized by that it is composed of a female body as primary component and a male body as secondary component both of which are produced, stored, and transported separately, and are mixed together when they are used, wherein the female body and the male body each have a specific surface area of 2800-7500 $cm^2/g$, the female body is mainly composed of inorganic cementitious materials and water, and it is slurry, paste or wet powder form in a wet state during the whole period of its production, storage, transportation and usage; the male body is mainly composed of inorganic cementitious materials, and it is a wet form;

in the female body, as proportion of its main constituents, CaO ranges from 20% by weight to 55% by weight, $Al_2O_3$ ranges from 1% by weight to 60% by weight, $SiO_2$ ranges from 50% by weight to 70% by weight, MgO ranges from 1.55% by weight to 40% by weight, and $Fe_2O_3$ ranges from 0% by weight to 25% by weight;

in the male body, pH=7-14, and as proportion of its main constituents, CaO ranges from greater than 0% by weight to 40% by weight, $SO_3$ ranges from greater than 0% by weight to 55% by weight, and $R_2O$ ranges from greater than 0% by weight to 80% by weight, and R is an alkali metal;

the portion of the two components of the wet cement is that the female body ranges from 60% by weight to 99% by weight, and the male body ranges from 1% by weight to 40% by weight, female body comprises a regulating agent for regulating setting time and working characteristics which is added during production period and/or after production of the female body, water content of the female body is from greater that 10% to 80% by weight, the water content of the male body is from 15% to 85% by weight, the female body is a wet material selected from the group consisting of a wet material produced by wet-milling one or more selected from the group consisting of amorphous or/and microcrystal iron-making slag, steel slag, blast furnace slag, fly ash, waste glass, phosphorus slag, titanium slag, fluorite slag, burned coal fines slag, and mixtures thereof as well as water and a regulating agent;

a wet material produced by mixing amorphous or/and microcrystal coal-burning boiler slag together with water and a regulating agent, and then carrying out a wet-milling step;

a wet material produced by taking the amorphous or/and microcrystal vitreous body located in the zone between Portland cement and glass in the $CaO—Al_2O_3—SiO_2$ ternary phase diagram as starting material, and obtaining a microcrystal and/or vitreous substance having potential water-hardening activity through the steps of starting materials selecting, formulating, mix-milling, calcining and melting, then mixing the obtained substance together with water and regulating agents, and carrying out a wet-milling step;

a wet material produced by mixing one or more selected from the group consisting of shale, clay, coal gangue and mixtures thereof calcined and dewatered at 500-1000 degrees centigrade, together with water and regulating agents, then carrying out a wet-milling step; and a wet material produced by mixing one or more selected from the group consisting of waste bricks, waste tiles and waste ceramics, and mixtures thereof, together with water and a regulating agent, then carrying out a wet-milling step, the male body is a wet material produced by mixing one or more selected from the group consisting of natural anhydrite, dihydrate gypsum, hemihydrate gypsum, phosphogypsum, fluorogypsum, salt gypsum, lime, calcium hydroxide, chemical industry lime, cement clinker and mixtures thereof, together with water and a regulating agent.

2. The sialite binary wet cement according to claim 1, characterized by that the alkali metal of the male body is K and/or Na.

3. The sialite binary wet cement according to claim 1, characterized by that the proportion of the two components of the wet cement is that the female body ranges from 70% by weight to 95% by weight, the male body ranges from 5% by weight to 30% by weight.

4. The sialite binary wet cement according to claim 1, characterized by that, in the female body, as the proportion of its main constituents, $Al_2O_3$ ranges from 2% by weight to 25% by weight, MgO ranges from 4% by weight to 13% by weight, and $Fe_2O_3$ ranges from 0% by weight to 12% by weight.

5. The sialite binary wet cement according to claim 1, characterized by that, in the male body, as the proportion of its main constituents, $SO_3$ ranges from greater than 0% by weight to 40% by weight, and $R_2O$ ranges from greater than 0% by weight to 20% by weight.

6. The sialite binary wet cement according to claim 1, characterized by that, the amorphous or/and micro-crystal coal-burning boiler slag is manufactured by adding calcium in the fuel method, wherein the boiler slag is from various industrial boilers which take coal as its fuel, the method comprises the following steps:

adding quick lime, slaked lime and lime stone and mineralizing agents, melting slags at a high temperature of 1300-1700 degrees Celsius during deslagging process when the slag is inside hearth or is departing from hearth or during the treatment process following after the deslagging step so as to melt partially or entirely the discharged slag, and then carrying out a rapidly cooling step so as to form amorphous or/and micro-crystal material.

7. The sialite binary wet cement according to claim 1, characterized by that, the amorphous or/and micro-crystal coal-burning boiler slag is manufactured by adding calcium in the slag method wherein the boiler slag is from various industrial boilers which take coal as its fuel, the method comprises the following steps:

adding quick lime, slaked lime and lime stone and mineralizing agents into the coal ash slag discharged after being burned, melting the ash and slag at a high temperature of 1300-1700 degrees Celsius during deslagging process or during the treatment process following after the deslagging step so as to melt partially or entirely the discharged ash slag, and then carrying out a rapidly cooling step so as to form amorphous or/and micro-crystal material.

8. The sialite binary wet cement according to claim 1, characterized by that, a part of the starting material of the female body is one or more selected from the group consisting of pozzolana, pearlite, obsidian, pumice, sand stone, quartz sand, mine tailing, zeolite, silica fume and mixtures thereof.

9. The sialite binary wet cement according to claim 1, characterized by that, the regulating agents for regulating setting time and working characteristics of the male body and female body are made of one or more selected from the group consisting of sugars, honeys, citric acid and citrate, tartaric acid and tartrate, strong alkali, dissolvable carbonate, muriate, dissolvable silicate, dissolvable sulfate, water glass, chlorinate, lignosulphonate, boric acid, borate and mixtures thereof.

10. The sialite binary wet cement according to claim 1, characterized by that, the water content of the female body is from 25% to 70% by weight.

11. The sialite binary wet cement according to claim 1, characterized by that, the water content of the male body is from 25% to 70% by weight.

12. The sialite binary wet cement according to claim 1, characterized by that, the amount of the regulating agent is from greater than 0% to 10% by weight based on total dry weight of the male body and female body.

13. The sialite binary wet cement according to claim 12, characterized by that, the amount of the regulating agent is from greater than 0% to 5% by weight based on total dry weight of the male body and female body.

14. A method for producing the sialite binary wet cement according to claim 1, characterized by that, under the premise of satisfying a required specific surface area, using different combinations of machines suitable to wet-crushing and wet-milling, and using a method called mixing first, then milling in which starting materials of the female body and starting materials of the male body are mixed first in their own proportions respectively and then they are wet-crushed and wet-milled so as to obtain a wet material respectively; and storing and transporting separately the obtained wet materials for the female body and male body.

15. A method for producing the sialite binary wet cement according to claim 1, characterized by that, under the premise of satisfying a required specific surface area, using different combinations of machines suitable to wet-crushing and wet-milling, and using a method called milling first, then mixing in which starting materials of the female body and male body are wet-crushed and wet-milled first respectively according to grindability, then mixing and homogenizing the levigated starting material in their own proportions so as to obtain a wet material respectively; and storing and transporting separately the obtained wet materials for the female body and male body.

16. A method for using the sialite binary wet cement according to claim 1, characterized by that, mixing the female body and male body of the wet cement together with water and aggegrate to produce a concrete.

17. The method of using the sialite binary wet cement according to claim 16, characterized by that, the aggregate is obtained from one or more of mountain sand, river sand, sea sand, gobi sand, crushed stone, bulk stone, waste stone, coal gangue, clay, classified sand, whole mine tailings, industrial waste slag and mixtures thereof.

18. A method for using the sialite binary wet cement according to claim 1, characterized by that, mixing the female body and male body to cause a hydrating reaction and a chemical reaction between liquid phase and solid phase, thereby forming cementitous materials which is one of crystal gel network or mixtures thereof.

19. A method for using the sialite binary wet cement according to claim 1, characterized by that, the cement is used in building, traffic, water conservancy, mine backfill and timbering, subgrade strengthening or underground engineering fields.

\* \* \* \* \*